(12) United States Patent
Yasuda et al.

(10) Patent No.: US 8,465,673 B2
(45) Date of Patent: Jun. 18, 2013

(54) HUMIDITY DEPENDENCE IMPROVER FOR POLYMER FILM, POLYMER FILM, PROTECTIVE FILM FOR POLARIZER, RETARDATION FILM, POLARIZER, AND LIQUID CRYSTAL DISPLAY DEVICE

(75) Inventors: Takayasu Yasuda, Minami-ashigara (JP); Masato Nagura, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 188 days.

(21) Appl. No.: 12/893,406

(22) Filed: Sep. 29, 2010

(65) Prior Publication Data
US 2011/0073007 A1    Mar. 31, 2011

(30) Foreign Application Priority Data
Sep. 30, 2009    (JP) ................. 2009-227017

(51) Int. Cl.
| | |
|---|---|
| *G02F 1/1335* | (2006.01) |
| *G02B 27/28* | (2006.01) |
| *C09K 19/02* | (2006.01) |
| *C07D 251/48* | (2006.01) |

(52) U.S. Cl.
USPC ........ 252/299.61; 252/589; 349/96; 349/194; 428/141; 544/194; 544/204

(58) Field of Classification Search
USPC ........ 252/299.61, 589; 349/96, 194; 428/141
See application file for complete search history.

(56) References Cited

FOREIGN PATENT DOCUMENTS

| | | | |
|---|---|---|---|
| JP | 2001-166144 A | 6/2001 | |
| JP | 2003-344655 A | 12/2003 | |
| JP | 2004-109410 A | 4/2004 | |
| JP | 2004243628 A | * | 9/2004 |
| JP | 2006002026 A | * | 1/2006 |

OTHER PUBLICATIONS

Kawada et al. JP 2001-166144, Jun. 22, 2001. English Machine Translation Provided.*
Kawamoto et al. JP 2003-344655,Dec. 3, 2003. English Machine Traslation Provided.*
Fukagawa et al. JP 2004-243628, Sep. 2, 2004. English Machine Traslation Provided.*
Hashimoto et al. JP 2006-002026, Jan. 5, 2006. English Machine Traslation Provided.*
Nagura et al., U.S. Appl. No. 12/893,378, entitled "*Cellulose Acylate Film, Retardation Film, Polarizer and Liquid Crystal Display Device*", filed on Sep. 29, 2010.

* cited by examiner

*Primary Examiner* — Venkataraman Balasubramanian
(74) *Attorney, Agent, or Firm* — Buchanan Ingersoll & Rooney PC

(57) ABSTRACT

A humidity dependence improver for polymer film, comprising a compound of the following formula (1) or (2):

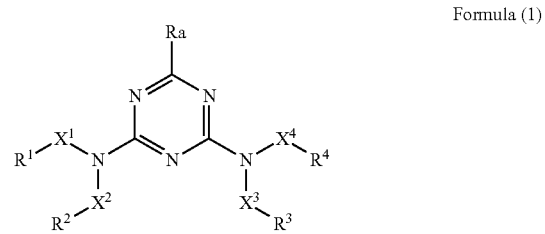

Formula (1)

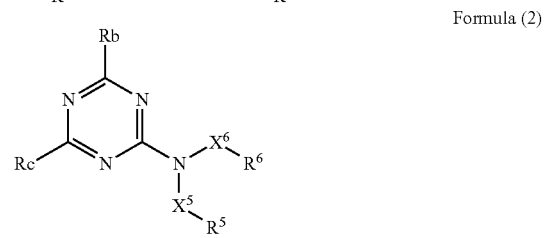

Formula (2)

wherein Ra, Rb and Rc represent an alkyl group, an alkenyl group, an alkynyl group, an aryl group or a heterocyclic group; $X^1$ to $X^6$ represent a single bond or a divalent linking group; $R^1$ to $R^6$ represent a hydrogen atom, an alkyl group, an alkenyl group, an alkynyl group, an aryl group or a heterocyclic group.

12 Claims, 1 Drawing Sheet

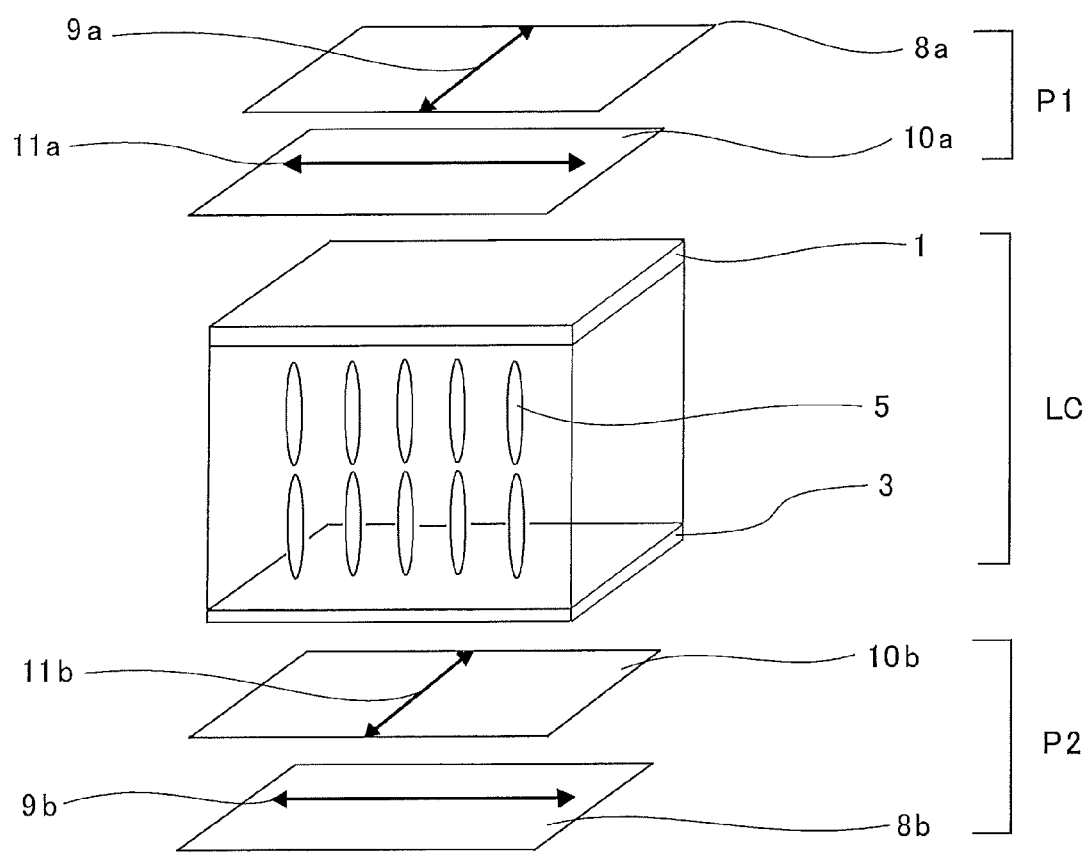

HUMIDITY DEPENDENCE IMPROVER FOR POLYMER FILM, POLYMER FILM, PROTECTIVE FILM FOR POLARIZER, RETARDATION FILM, POLARIZER, AND LIQUID CRYSTAL DISPLAY DEVICE

CROSS-REFERENCE TO RELATED APPLICATIONS

The present application claims the benefit of priority from Japanese Patent Application No. 227017/2009, filed on Sep. 30, 2009, the contents of which are herein incorporated by reference in their entirety.

BACKGROUND OF THE INVENTION

1. Field of the Invention

The present invention relates to a humidity dependence improver for polymer film, a polymer film containing it, a protective film for polarizer, a retardation film, a polarizer containing the film and a liquid crystal display device, especially a VA (vertical aligned)-mode liquid crystal display device.

2. Description of the Related Art

The display characteristics of liquid crystal display devices are being improved more and more these days, and it is known that a retardation film having a specific Re and a specific Rth is placed between a polarizer and a liquid crystal cell to remarkably improve viewing angle characteristics of the liquid crystal display device.

As one of the methods for controlling Re and Rth of a retardation film, JP-A 2004-109410 discloses a method of adding a retardation enhancer to a polymer film. The retardation enhancer disclosed in this reference is a compound containing a keto-enol tautomerizable structure as its constitutive element and capable of forming a molecular complex; and as one example thereof, the reference discloses a compound having a guanamine skeleton such as 1,3,5-triazine ring. As other retardation enhancer, JP-A 2001-166144 and 2003-344655 disclose a discotic compound and a compound having a 1,3,5-triazine ring-containing structure other than the above.

On the other hand, the present inventors have investigated other characteristics of the polymer film containing such a retardation enhancer, and have found that Re and Rth of the film greatly fluctuate depending on the change in the humidity of the usage environment (that may be referred to as humidity dependence of Re and Rth).

SUMMARY OF THE INVENTION

Accordingly, an object of the invention is to provide a humidity dependence improver for polymer film, which can prevent the fluctuation of Re and Rth of polymer film in humidity change in the usage environment. Other objects of the invention are to provide a polymer film containing the humidity dependence improver, a protective film for polarizer comprising the polymer film, a retardation film comprising the polymer film, a polarizer comprising the polymer film or the retardation film, and a liquid crystal display device.

The present inventors have investigated various compounds as additives for improving the fluctuation of Re and Rth in humidity change in the usage environment. As a result, they have found that when a compound comprising a 1,3,5-triazine ring having specific substituents in a specific configuration is added to a polymer film substrate, then the fluctuation of Re and Rth in humidity change in the usage environment can be remarkably inhibited.

The compounds having the specific substituents on a 1,3,5-triazine ring, as selected in the present invention, differ in preferable range from such compounds as in JP-A 2001-166144 that were found based on the discotic shape (or the planarity) thereof to have the ability to increase Rth, and are not limited to those having a discotic shape.

Concretely, the means for solving the above-mentioned problems of the invention are as follows:

[1] A humidity dependence improver for polymer film, comprising a compound of the following formula (1) or (2):

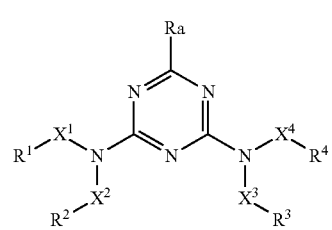

Formula (1)

wherein Ra represents an alkyl group, an alkenyl group, an alkynyl group, an aryl group or a heterocyclic group; $X^1$, $X^2$, $X^3$ and $X^4$ each independently represent a single bond or a divalent linking group; $R^1$, $R^2$, $R^3$ and $R^4$ each independently represent a hydrogen atom, an alkyl group, an alkenyl group, an alkynyl group, an aryl group or a heterocyclic group,

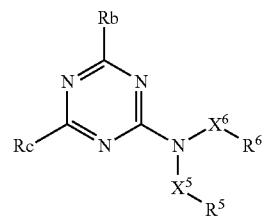

Formula (2)

wherein Rb and Rc each independently represent an alkyl group, an alkenyl group, an alkynyl group, an aryl group or a heterocyclic group; $X^5$ and $X^6$ each independently represent a single bond or a divalent linking group; $R^5$ and $R^6$ each independently represent a hydrogen atom, an alkyl group, an alkenyl group, an alkynyl group, an aryl group or a heterocyclic group.

[2] The humidity dependence improver for polymer film of [1], wherein in the formula (1) and (2), $X^1$, $X^2$, $X^3$, $X^4$, $X^5$, and $X^6$ are each independently any one selected from a single bond and a group of divalent linking groups of the following formula (3):

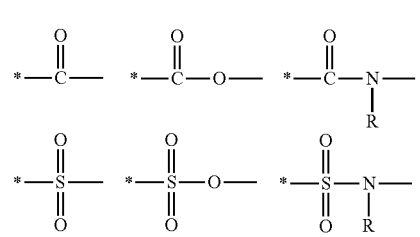

Formula (3)

wherein R represents a hydrogen atom or an alkyl group, and the side * is the linking site to the N atom that bonds to the 1,3,5-triazine ring in the compound of the formula (1) or (2).

[3] The humidity dependence improver for polymer film of [1] or [2], comprising the compound of the formula (1).

[4] The humidity dependence improver for polymer film of any one of [1] to [3], wherein the compound of the formula (1) is represented by the following formula (4):

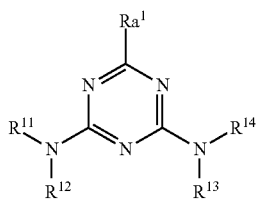

Formula (4)

wherein $Ra^1$ represents an alkyl group, an alkenyl group, an alkynyl group, an aryl group or a heterocyclic group; $R^{11}$, $R^{12}$, $R^{13}$ and $R^{14}$ each independently represent a hydrogen atom, an alkyl group, an alkenyl group, an alkynyl group, an aryl group or a heterocyclic group.

[5] The humidity dependence improver for polymer film of any one of [1] to [3], wherein the compound of the formula (1) is represented by the following formula (5):

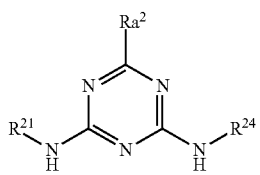

Formula (5)

wherein $Ra^2$ represents an alkyl group, an alkenyl group, an alkynyl group, an aryl group or a heterocyclic group; $R^{21}$ and $R^{24}$ each independently represent a hydrogen atom, an alkyl group, an alkenyl group, an alkynyl group, an aryl group or a heterocyclic group.

[6] The humidity dependence improver for polymer film of any one of [1] to [3], wherein the compound of the formula (1) is represented by the following formula (6):

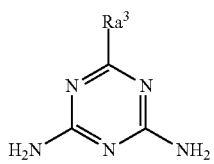

Formula (6)

wherein $Ra^3$ represents an alkyl group, an alkenyl group, an alkynyl group, an aryl group or a heterocyclic group.

[7] The humidity dependence improver for polymer film of any one of [1] to [3], wherein the compound of the formula (1) is represented by the following formula (6b):

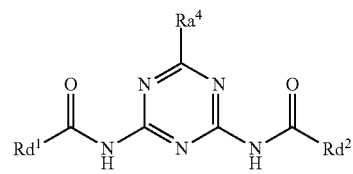

Formula (6b)

wherein $Ra^4$ represents an alkyl group, an alkenyl group, an alkynyl group, an aryl group or a heterocyclic group, and $Rd^1$ and $Rd^2$ each independently represent an alkyl group or an aryl group.

[8] The humidity dependence improver for polymer film of [6] or [7], wherein $Ra^3$ or $Ra^4$ is an alkyl group.

[9] The humidity dependence improver for polymer film of [1] or [2], comprising the compound of the formula (2).

[10] The humidity dependence improver for polymer film of [1], [2] or [9], wherein the compound of the formula (2) is represented by the following formula (7):

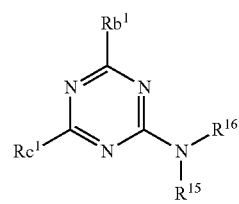

Formula (7)

wherein $Rb^1$ and $Rc^1$ each independently represent an alkyl group, an alkenyl group, an alkynyl group, an aryl group or a heterocyclic group; $R^{15}$ and $R^{16}$ each independently represent a hydrogen atom, an alkyl group, an alkenyl group, an alkynyl group, an aryl group or a heterocyclic group.

[11] The humidity dependence improver for polymer film of [1], [2] or [9], wherein the compound of the formula (2) is represented by the following formula (8):

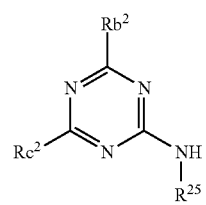

Formula (8)

wherein $Rb^2$ and $Rc^2$ each independently represent an alkyl group, an alkenyl group, an alkynyl group, an aryl group or a heterocyclic group; $R^{25}$ represents a hydrogen atom, an alkyl group, an alkenyl group, an alkynyl group, an aryl group or a heterocyclic group.

[12] The humidity dependence improver for polymer film of [1], [2] or [9], wherein the compound of the formula (2) is represented by the following formula (9):

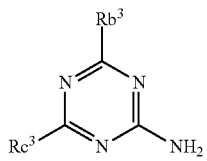

Formula (9)

wherein $Rb^3$ and $Rc^3$ each independently represent an alkyl group, an alkenyl group, an alkynyl group, an aryl group or a heterocyclic group.

[13] The humidity dependence improver for polymer film of [12], wherein $Rb^3$ and $Rc^3$ are both alkyl groups.

[14] The humidity dependence improver for polymer film of any one of [1] to [13] wherein the compound of the formula (1) or (2) is an Rth reducer.

[15] A polymer film comprising the humidity dependence improver for polymer film of any one of [1] to [14], and a polymer having a hydroxyl group.

[16] The polymer film of [15], wherein the group having a hydroxyl group is a cellulose acylate resin.

[17] The polymer film of [16], wherein the cellulose acylate resin is a cellulose acetate resin.

[18] A retardation film comprising the polymer film of any one of [15] to [17].

[19] A polarizer comprising the polymer film of any one of [15] to [17] or the retardation film of [18].

[20] A liquid crystal display device comprising the polymer film of any one of [15] to [17], the retardation film of [18] or the polarizer of [19].

The humidity dependence improver of the invention has an excellent effect of inhibiting Re and Rth fluctuation of polymer film in humidity change in the usage environment, and is therefore favorably usable for the protective film for polarizer, the retardation film or the polarizer in liquid crystal display devices, especially favorably for the liquid crystal display device of the invention.

BRIEF DESCRIPTION OF THE DRAWING

FIG. 1 is a schematic view showing the constitution of one example of the liquid crystal display device of the invention.

In the drawing, 1 is an upper substrate of liquid crystal cell, 3 is a lower substrate of liquid crystal cell, 5 is a liquid crystal layer (liquid crystal molecule), 8a and 8b each are a protective film for polarizer, 9a and 9b each are the absorption axis of the protective film for polarizer, 10a and 10b each are a retardation film (polymer film of the invention); 11a and 11b each are the absorption axis of the retardation film (polymer film of the invention), P1 and P2 each are a polarizer, and LC is a liquid crystal cell.

BEST MODE FOR CARRYING OUT THE INVENTION

Description will now be made in detail of the invention. Although the following description of its structural features may often be made on the basis of typical embodiments of the invention, it is to be understood that the invention is not limited to any such embodiment. It is also to be noted that every numerical range as herein expressed by employing the words "from" and "to", or simply the word "to", or the symbol "~" is supposed to include the lower and upper limits thereof as defined by such words or symbol, unless otherwise noted. In the invention, "mass %" means equal to "weight %", and "% by mass" means equal to "% by weight".

First of all, the definition of the terms used in this specification is described below.

(Retardation ($Re(\lambda)$ and $Rth(\lambda)$))

In this specification, $Re(\lambda)$ and $Rth(\lambda)$ are retardation in plane (nm) and retardation along the thickness direction (nm), respectively, at a wavelength of $\lambda$. $Re(\lambda)$ is measured by applying light having a wavelength of $\lambda$ mu to a film in the normal direction of the film, using KOBRA 21ADH or WR (by Oji Scientific Instruments).

When a film to be analyze by a monoaxial or biaxial index ellipsoid, $Rth(\lambda)$ of the film is calculated as follows.

$Rth(\lambda)$ is calculated by KOBRA 21ADH or WR based on six $Re(\lambda)$ values which are measured for incoming light of a wavelength $\lambda$ nm in six directions which are decided by a 10° step rotation from 0° to 50° with respect to the normal direction of a sample film using an in-plane slow axis, which is decided by KOBRA 21ADH, as an inclination axis (a rotation axis; defined in an arbitrary in-plane direction if the film has no slow axis in plane); a value of hypothetical mean refractive index; and a value entered as a thickness value of the film.

In the above, when the film to be analyzed has a direction in which the retardation value is zero at a certain inclination angle, around the in-plane slow axis from the normal direction as the rotation axis, then the retardation value at the inclination angle larger than the inclination angle to give a zero retardation is changed to negative data, and then the $Rth(\lambda)$ of the film is calculated by KOBRA 21ADH or WR.

Around the slow axis as the inclination angle (rotation angle) of the film (when the film does not have a slow axis, then its rotation axis may be in any in-plane direction of the film), the retardation values are measured in any desired inclined two directions, and based on the data, and the estimated value of the mean refractive index and the inputted film thickness value, Rth may be calculated according to the following formulae (X) and (XI):

$$Re(\theta) = \left[nx - \frac{ny \times nz}{\sqrt{\left(ny\sin\left(\sin^{-1}\left(\frac{\sin(-\theta)}{nx}\right)\right)\right)^2 + \left(nz\cos\left(\sin^{-1}\left(\frac{\sin(-\theta)}{nx}\right)\right)\right)^2}}\right] \times \frac{d}{\cos\left(\sin^{-1}\left(\frac{\sin(-\theta)}{nx}\right)\right)} \quad \text{Formula (X)}$$

$$Rth = \left[\frac{nx + ny}{2} - nz\right] \times d \quad \text{Formula (XI)}$$

wherein $Re(\theta)$ represents a retardation value in the direction inclined by an angle $\theta$ from the normal direction; nx represents a refractive index in the in-plane slow axis direction; ny represents a refractive index in the in-plane direction perpendicular to nx; and nz represents a refractive index in the direction perpendicular to nx and ny. And "d" is a thickness of the sample.

When the film to be analyzed is not expressed by a monoaxial or biaxial index ellipsoid, or that is, when the film does not have an optical axis, then $Rth(\lambda)$ of the film may be calculated as follows.

Re(λ) of the film is measured around the slow axis (judged by KOBRA 21ADH or WR) as the in-plane inclination axis (rotation axis), relative to the normal direction of the film from −50 degrees up to +50 degrees at intervals of 10 degrees, in 11 points in all with a light having a wavelength of λ nm applied in the inclined direction; and based on the thus-measured retardation values, the estimated value of the mean refractive index and the inputted film thickness value, Rth(λ) of the film may be calculated by KOBRA 21ADH or WR.

In the above measurement, as the estimated value of the mean refractive index, values in Polymer Handbook (by John Wiley & Sons, Inc.) or those in polymer film catalogues may be used. Materials of which the mean refractive index is unknown may be analyzed with an Abbe's refractometer to determine their data. For example, the mean refractive index values of some optical films are as follows:

cellulose acylate (1.48), cycloolefin polymer (1.52), polycarbonate (1.59), polymethylmethacrylate (1.49) and polystyrene (1.59).

By inputting the value of these average refraction indices and thickness, KOBRA 21ADH or WR computes nx, ny, nz. From the computed nx, ny, nz, Nz=(nx−nz)/(nx−ny) is computed further.

In the invention, "slow axis" of retardation films and others means the direction in which the refractive index is the largest. "Visible light region" means from 380 nm to 780 nm. Unless otherwise specifically indicated, the refractive index is one measured at λ=589 nm in the visible light region.

In this specification, the numerical data, the numerical range and the qualitative expression (for example, "equivalent", "same", etc.) indicating the optical properties of constitutive components such as retardation film, liquid crystal layer and others should be so interpreted as to indicate the numerical data, the numerical range and the qualitative expression that include the error range generally acceptable for liquid crystal display devices and their constitutive components.

1. Humidity Dependence Improver for Polymer Film:

(1-1) Structure of Humidity Dependence Improver for Polymer Film:

The humidity dependence improver for polymer film of the invention is characterized by containing a compound of the above-mentioned formula (1) or formula (2). The humidity dependence improver for polymer film of the invention is a compound which is added to a polymer film and whereby capable to reducing the fluctuation of at least one of Re and Rth of the film in humidity change in the usage environment. The structure of the compound of the above-mentioned formula (1) or formula (2) for use in the invention is described in detail below.

When a conventional compound having a 1,3,5-triazine ring is added to a polymer film (for example, cellulose acylate resin), the planarity of the configuration of the compound having a 1,3,5-triazine ring as a whole is specifically noted, and therefore the compound having the structure of the above-mentioned formula (1) or (2) in the invention has heretofore been noted little.

In the compound of the above-mentioned formulae (1) and (2) for use in the invention, $X^1, X^2, X^3, X^4, X^5$ and $X^6$ are each independently any one selected from a single bond and a group of divalent linking groups of the following formula (3):

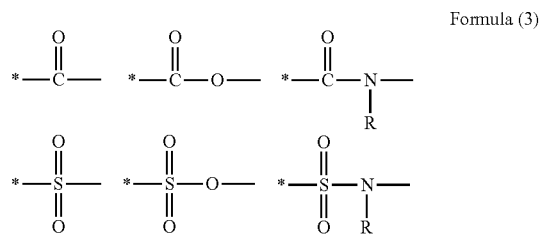

Formula (3)

In the formula (3), R represents a hydrogen atom or an alkyl group, and the side * is the linking site to the N atom that bonds to the 1,3,5-triazine ring in the compound of the formula (1) or (2).

Compound of Formula (1):

First described is the compound of the formula (1). In this specification, the hydrocarbon group such as an alkyl group or the like may be linear or branched, not contradictory to the scope of the sprit of the invention.

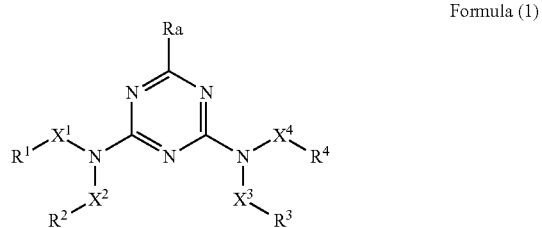

Formula (1)

In the formula (1), Ra represents an alkyl group, an alkenyl group, an alkynyl group, an aryl group or a heterocyclic group; $X^1$, $X^2$, $X^3$ and $X^4$ each independently represent a single bond or a divalent linking group; $R^1$, $R^2$, $R^3$ and $R^4$ each independently represent a hydrogen atom, an alkyl group, an alkenyl group, an alkynyl group, an aryl group or a heterocyclic group.

Ra represents an alkyl group, an alkenyl group, an alkynyl group, an aryl group or a heterocyclic group, and is preferably an alkyl group or an aryl group, more preferably an alkyl group from the viewpoint of the humidity dependence improvability of the compound. Especially in the case where the cellulose acylate resin for the film in the invention is a cellulose acetate resin, Ra is especially preferably an alkyl group from the viewpoint of the humidity dependence improvability of the compound, even more preferably an unsubstituted alkyl group.

When Ra is an alkyl group, preferably, it has from 1 to 20 carbon atoms, more preferably from 1 to 12 carbon atoms, even more preferably from 1 to 8 carbon atoms.

When Ra is an alkenyl group, preferably, it has from 2 to 12 carbon atoms, more preferably from 2 to 8 carbon atoms.

When Ra is an alkynyl group, preferably, it has from 2 to 12 carbon atoms, more preferably from 2 to 8 carbon atoms.

When Ra is an aryl group, preferably, it has from 6 to 24 carbon atoms, more preferably from 6 to 18 carbon atoms, even more preferably from 6 carbon atoms from the viewpoint of the humidity dependence improvability of the compound.

When Ra is a heterocyclic group, preferably, it has from 2 to 23 carbon atoms, more preferably from 2 to 17 carbon atoms, even more preferably from 2 to 6 carbon atoms from the viewpoint of the humidity dependence improvability of the compound. The number of atoms constituting the ring of the heterocyclic group is preferably from 4 to 24, more preferably from 5 to 12, particularly preferably 5 or 6. Examples of the heterocyclic group include a pyrrolyl group, a pyrrolidino group, a pyrazolyl group, a pyrazolidino group, an imidazolyl group, a piperazino group and a morpholino group.

The following substituent T is exemplified as the substituent that Ra may have. Examples of the substituent T include an alkyl group (including, preferably, 1-20 carbon atoms, more preferably 1-12 carbon atoms, particularly preferably 1-8 carbon atoms, such as a methyl group, an ethyl group, an isopropyl group, a tert-butyl group, a n-octyl group, a n-decyl group, a n-hexadecyl group, a cyclopropyl group, a cyclopentyl group and a cyclohexyl group), an alkenyl group (including, preferably, 2-20 carbon atoms, more preferably 2-12 carbon atoms, particularly preferably 2-8 carbon atoms, such as a vinyl group, an allyl group, a 2-butenyl group and a 3-pentenyl group), an alkynyl group (including, preferably, 2-20 carbon atoms, more preferably 2-12 carbon atoms, particularly preferably 2-8 carbon atoms, such as a propagyl group and a 3-pentynyl group), an aryl group (including, preferably, 6-30 carbon atoms, more preferably 6-20 carbon atoms, particularly preferably 6-12 carbon atoms, such as a phenyl group, a p-methylphenyl group and a naphthyl group), amino group (including, preferably, 0-20 carbon atoms, more preferably 0-10 carbon atoms, particularly preferably 0-6 carbon atoms, such as an amino group, a methylamino group, a dimethylamino group, a diethylamino group and a dibenzylamino group), an alkoxy group (including, preferably, 1-20 carbon atoms, more preferably 1-12 carbon atoms, particularly preferably 1-8 carbon atoms, such as a methoxy group, an ethoxy group and a butoxy group), an aryloxy group (including, preferably, 6-20 carbon atoms, more preferably 6-16 carbon atoms, particularly preferably 6-12 carbon atoms, such as a phenyloxy group and a 2-naphthyloxy group), an acyl group (including, preferably, 1-20 carbon atoms, more preferably 1-16 carbon atoms, particularly preferably 1-12 carbon atoms, such as an acetyl group, a benzoyl group, a formyl group and a pivaloyl group), an alkoxycarbonyl group (including, preferably, 2-20 carbon atoms, more preferably 2-16 carbon atoms, particularly preferably 2-12 carbon atoms, such as a methoxycarbonyl group and an ethoxycarbonyl group), an aryloxycarbonyl group (including, preferably, 7-20 carbon atoms, more preferably 7-16 carbon atoms, and particularly preferably 7-10 carbon atoms, such as a phenyloxycarbonyl group), an acyloxy group (including, preferably, 2-20 carbon atoms, more preferably 2-16 carbon atoms, particularly preferably 2-10 carbon atoms, such as an acetoxy group and a benzoyloxy group), an acylamino group (including, preferably, 2-20 carbon atoms, more preferably 2-16 carbon atoms, particularly preferably 2-10 carbon atoms, such as an acetylamino group and a benzoylamino group), an alkoxycarbonylamino group (including, preferably, 2-20 carbon atoms, more preferably 2-16 carbon atoms, particularly preferably 2-12 carbon atoms, such as a methoxycarbonylamino group), an aryloxycarbonylamino group (including, preferably, 7-20 carbon atoms, more preferably 7-16 carbon atoms, particularly preferably 7-12 carbon atoms, such as a phenyloxycarbonylamino group), a sulfonylamino group (including, preferably, 1-20 carbon atoms, more preferably 1-16 carbon atoms, particularly preferably 1-12 carbon atoms, such as a methanesulfonylamino group and a benzenesulfonylamino group), a sulfamoyl group (including, preferably, 0-20 carbon atoms, more preferably 0-16 carbon atoms, particularly preferably 0-12 carbon atoms, such as a sulfamoyl group, a methylsulfamoyl group, a dimethylsulfamoyl group and a phenylsulfamoyl group), a carbamoyl group (including, preferably, 1-20 carbon atoms, more preferably 1-16 carbon atoms, particularly preferably 1-12 carbon atoms, such as a carbamoyl group, a methylcarbamoyl group, a diethylcarbamoyl group and a phenylcarbamoyl group), an alkylthio group (including, preferably, 1-20 carbon atoms, more preferably 1-16 carbon atoms, particularly preferably 1-12 carbon atoms, such as a methylthio group and an ethylthio group), an arylthio group (including, preferably, 6-20 carbon atoms, more preferably 6-16 carbon atoms, particularly preferably 6-12 carbon atoms, such as a phenylthio group), a sulfonyl group (including, preferably, 1-20 carbon atoms, more preferably 1-16 carbon atoms, particularly preferably 1-12 carbon atoms, such as a mesyl group and a tosyl group), a sulfinyl group (including, preferably, 1-20 carbon atoms, more preferably 1-16 carbon atoms, particularly preferably 1-12 carbon atoms, such as a methanesulfinyl group and a benzenesulfinyl group), an ureide group (including, preferably, 1-20 carbon atoms, more preferably 1-16 carbon atoms, and particularly preferably 1-12 carbon atoms, such as an ureide group, a methylureide group and a phenylureide group), a phosphoric amide group (including, preferably, 1-20 carbon atoms, more preferably 1-16 carbon atoms, particularly preferably 1-12 carbon atoms, such as a diethylphosphoric amide group and a phenylphosphoric amide group), a hydroxyl group, a mercapto group, a halogen atom (such as a fluorine atom, a chlorine atom, a bromine atom, an iodine atom and etc.), a cyano group, a sulfo group, a carboxyl group, a nitro group, a hydroxamic acid group, a sulfino group, a hydrazino group, an imino group, a heteroring group (including, preferably, 1-30 carbon atoms, more preferably 1-12 carbon atoms, wherein examples of the hetero atom include a nitrogen atom, an oxygen atom and a sulfur atom, and specific examples include an imidazolyl group, a pyridyl group, a quinolyl group, a furyl group, a piperidyl group, a morpholino group, a benzoxysazolyl group, a benzimidazolyl group and a benzothiazolyl group), and a silyl group (including, preferably, 3-40 carbon atoms, more preferably 3-30 carbon atoms, particularly preferably 3-24 carbon atoms, such as a trimethylsilyl group and a triphenylsilyl group). These substituents may further have a substituent. When there are two substituents or more, they may be same with or different from each other. Further, when possible, they may be linked with each other to form a ring.

The divalent linking group which $X^1$, $X^2$, $X^3$ and $X^4$ each independently represent includes, for example, a divalent linking group represented by the following formula (3), an alkylene group (preferably having from 1 to 30 carbon atoms, more preferably from 1 to 3 carbon atoms, even more preferably 2 carbon atoms), and an arylene group (preferably having from 6 to 30 carbon atoms, more preferably from 6 to 10 carbon atoms). Of those, preferred is a divalent linking group represented by the following formula (3), and more preferred is a carbonyl group.

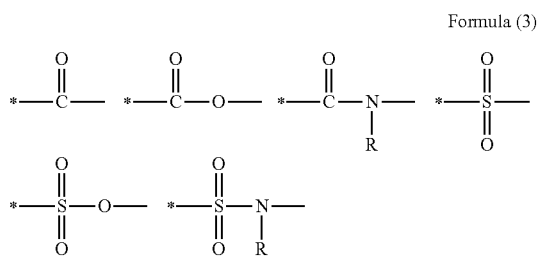

Formula (3)

In the formula (3), R represents a hydrogen atom or an alkyl group, and the side * is the linking site to the N atom that bonds to the 1,3,5-triazine ring in the compound of the formula (1).

$R^1$, $R^2$, $R^3$ and $R^4$ each independently represent a hydrogen atom, an alkyl group, an alkenyl group, an alkynyl group, an aryl, group or a heterocyclic group, preferably a hydrogen atom, an alkyl group, an aryl group or a heterocyclic group, more preferably a hydrogen atom, an alkyl group or a heterocyclic group. Preferably, at least one of $R^1$ or $R^2$ is a hydrogen atom; and also preferably at least one of $R^3$ or $R^4$ is a hydrogen atom.

In the case where $R^1$, $R^2$, $R^3$ and $R^4$ each are an alkyl group, the group preferably has from 1 to 12 carbon atoms, more preferably from 1 to 6 carbon atoms, even more preferably from 1 to 4 carbon atoms. When $R^1$, $R^2$, $R^3$ and $R^4$ each are an alkyl group and X is —C(=O)—, then the preferred range of $R^1$, $R^2$, $R^3$ and $R^4$ is the same as the preferred range in the case where $Rd^1$ and $Rd^2$ each is an alkyl group in the formula (6b) described below from the viewpoint of the humidity dependence improvability.

In the case where $R^1$, $R^2$, $R^3$ and $R^4$ each are an alkenyl group, the group preferably has from 2 to 12 carbon atoms, more preferably from 2 to 6 carbon atoms, even more preferably from 2 to 4 carbon atoms.

In the case where $R^1$, $R^2$, $R^3$ and $R^4$ each are an alkynyl group, the group preferably has from 2 to 12 carbon atoms, more preferably from 2 to 6 carbon atoms, even more preferably from 2 to 4 carbon atoms.

In the case where $R^1$, $R^2$, $R^3$ and $R^4$ each are an aryl group, the group preferably has from 6 to 18 carbon atoms, more preferably from 6 to 12 carbon atoms, even more preferably 6 carbon atoms from the viewpoint of the humidity dependence improvability of the compound. When $R^1$, $R^2$, $R^3$ and $R^4$ each are an aryl group and X is —C(=O)—, then the preferred range of $R^1$, $R^2$, $R^3$ and $R^4$ is the same as the preferred range in the case that $Rd^1$ and $Rd^2$ each is an aryl group in the formula (6b) described below from the viewpoint of the humidity dependence improvability.

In the case where $R^1$, $R^2$, $R^3$ and $R^4$ each are a heterocyclic group, the group preferably has from 4 to 13 carbon atoms, more preferably from 4 to 9 carbon atoms, even more preferably 5 carbon atoms from the viewpoint of the humidity dependence improvability of the compound.

$R^1$, $R^2$, $R^3$ and $R^4$ each may have or may not have an additional substituent, and the substituent includes the above-mentioned substituent group T.

R in the formula (3) is more preferably a hydrogen atom or an alkyl group, particularly preferably a hydrogen atom.

More preferably, the compound represented by the formula (1) is represented by the following formula (4):

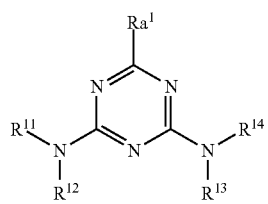

Formula (4)

$Ra^1$ represents an alkyl group, an alkenyl group, an alkynyl group, an aryl group or a heterocyclic group, and their preferred ranges are the same as those of the above-mentioned Ra.

$R^{11}$, $R^{12}$, $R^{13}$ and $R^{14}$ each independently represent a hydrogen atom, an alkyl group, an alkenyl group, an alkynyl group, an aryl group or a heterocyclic group, and their preferred ranges are the same as those of the above-mentioned $R^1$, $R^2$, $R^3$ and $R^4$.

Even more preferably, the compound represented by the formula (1) is represented by the following formula (5):

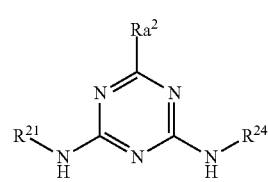

Formula (5)

$Ra^2$ represents an alkyl group, an alkenyl group, an alkynyl group, an aryl group or a heterocyclic group, and their preferred ranges are the same as those of the above-mentioned Ra.

$R^{21}$ and $R^{24}$ each independently represent a hydrogen atom, an alkyl group, an alkenyl group, an alkynyl group, an aryl group or a heterocyclic group, and their preferred ranges are the same as those of the above-mentioned $R^1$, $R^2$, $R^3$ and $R^4$.

Further preferably, $R^{21}$ and $R^{24}$ are both hydrogen atoms from the viewpoint of the humidity dependence improvability of the compound for Rth of polymer film.

Still more preferably, the compound represented by the formula (1) is represented by the following formula (6):

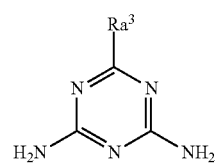

Formula (6)

$Ra^3$ represents an alkyl group, an alkenyl group, an alkynyl group, an aryl group or a heterocyclic group, and their preferred ranges are the same as those of the above-mentioned Ra.

In the compound for use in the invention, $Ra^3$ is preferably an alkyl group from the viewpoint of the ability of the compound to lower Rth of polymer film and improve the humidity dependence of the retardation thereof, and in such a case, $Ra^3$ is more preferably an unsubstituted alkyl group.

Particularly preferably, the compound represented by the formula (1) is represented by the following formula (6b):

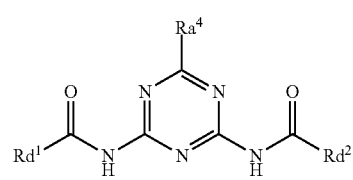

Formula (6b)

wherein $Ra^4$ represents an alkyl group, an alkenyl group, an alkynyl group, an aryl group or a heterocyclic group, and $Rd^1$ and $Rd^2$ each independently represent an alkyl group or an aryl group.

$Ra^4$ in the formula (6b) represents an alkyl group, an alkenyl group, an alkynyl group, an aryl group or a heterocyclic group, and their preferred ranges are the same as those of the above-mentioned Ra. In the polymer film of the invention, Ra⁴ is preferably an alkyl group, more preferably an unsubstituted alkyl group, particularly preferably a methyl group for the purpose of improving the humidity dependence of the film while Rth is reduced.

Rd¹ and Rd² in the formula (6b) each independently represent an alkyl group or an aryl group. These groups may have a substituent. When Rd¹ and Rd² is a substituted aryl group, examples of the substituent include a halogen atom (including preferably a chlorine atom), an alkyl group (including preferably from 1 to 10 carbon atoms, more preferably from 1 to 5 carbon atoms, particularly preferably a methyl group, and may be linear or branched), an alkoxy group (including preferably from 1 to 3 carbon atoms, more preferably a methoxyl group). Preferred are a halogen atom and an alkyl group. When Rd¹ and Rd² is a substituted alkyl group (that may be linear or branched), preferred is an unsubstituted alkyl group, more preferred is an unsubstituted alkyl group having from 1 to 10 carbon atoms, still more preferred is an unsubstituted alkyl group having from 3 to 9 carbon atoms, particularly preferred is an unsubstituted alkyl group having from 3 to 6 carbon atoms.

More preferably, Rd¹ and Rd² each independently represents an aryl group which may be substituted. Rd¹ and Rd² each independently represents preferably a substituted or unsubstituted aryl group having from 6 to 10 carbon atoms, particularly preferably a substituted or unsubstituted phenyl group. In the case where the phenyl group has a substituent, it is preferably at a para position.

Particularly preferably, Rd¹ and Rd² are an unsubstituted phenyl group.

Rd¹ and Rd² may be the same or different and preferably Rd¹ and Rd² are the same.

Compound of Formula (2):

Next described is the compound represented by the formula (2).

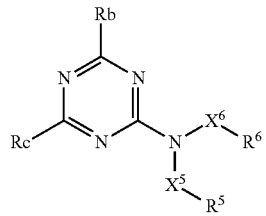

Formula (2)

In the formula (2), Rb and Rc each independently represent an alkyl group, an alkenyl group, an alkynyl group, an aryl group or a heterocyclic group; X⁵ and X⁶ each independently represent a single bond or a divalent linking group; R⁵ and R⁶ each independently represent a hydrogen atom, an alkyl group, an alkenyl group, an alkynyl group, an aryl group or a heterocyclic group.

Rb and Rc each independently represent an alkyl group, an alkenyl group, an alkynyl group, an aryl group or a heterocyclic group, and their preferred ranges are the same as those of the above-mentioned Ra.

X⁵ and X⁶ each independently represent a single bond or a divalent linking group, and their preferred ranges are the same as those of the above-mentioned X¹, X², X³ and X⁴.

R⁵ and R⁶ each independently represent a hydrogen atom, an alkyl group, an alkenyl group, an alkynyl group, an aryl group or a heterocyclic group, and their preferred ranges are the same as those of the above-mentioned R¹, R², R³ and R⁴.

Preferably, the compound represented by the formula (2) is represented by the following formula (7):

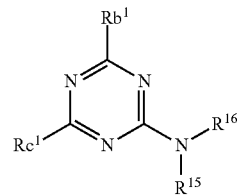

Formula (7)

Rb¹ and Rc¹ each independently represent an alkyl group, an alkenyl group, an alkynyl group, an aryl group or a heterocyclic group, and their preferred ranges are the same as those of the above-mentioned Ra.

R¹⁵ and R¹⁶ each independently represent a hydrogen atom, an alkyl group, an alkenyl group, an alkynyl group, an aryl group or a heterocyclic group, and their preferred ranges are the same as those of the above-mentioned R¹, R², R³ and R⁴.

More preferably, the compound represented by the formula (2) is represented by the following formula (8):

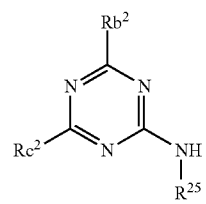

Formula (8)

Rb² and Rc² each independently represent an alkyl group, an alkenyl group, an alkynyl group, an aryl group or a heterocyclic group, and their preferred ranges are the same as those of the above-mentioned Ra.

R²⁵ represents a hydrogen atom, an alkyl group, an alkenyl group, an alkynyl group, an aryl group or a heterocyclic group, and their preferred ranges are the same as those of the above-mentioned R²¹ and R²⁴.

Even more preferably, the compound represented by the formula (2) is represented by the following formula (9):

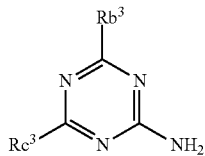

Formula (9)

Rb³ and Rc³ each independently represent an alkyl group, an alkenyl group, an alkynyl group, an aryl group or a heterocyclic group, and their preferred ranges are the same as those of the above-mentioned Ra.

Further preferably, in the compound for use in the invention, Rb³ and Rc³ are both alkyl groups from the viewpoint of the ability of the compound to lower Rth of polymer film and improve the humidity dependence of the retardation thereof, and in such a case, Rb³ and Rc³ are more preferably unsubstituted alkyl groups.

Specific examples of the compounds of the formula (1) or (2) are mentioned below, to which, however, the invention should not be limited.

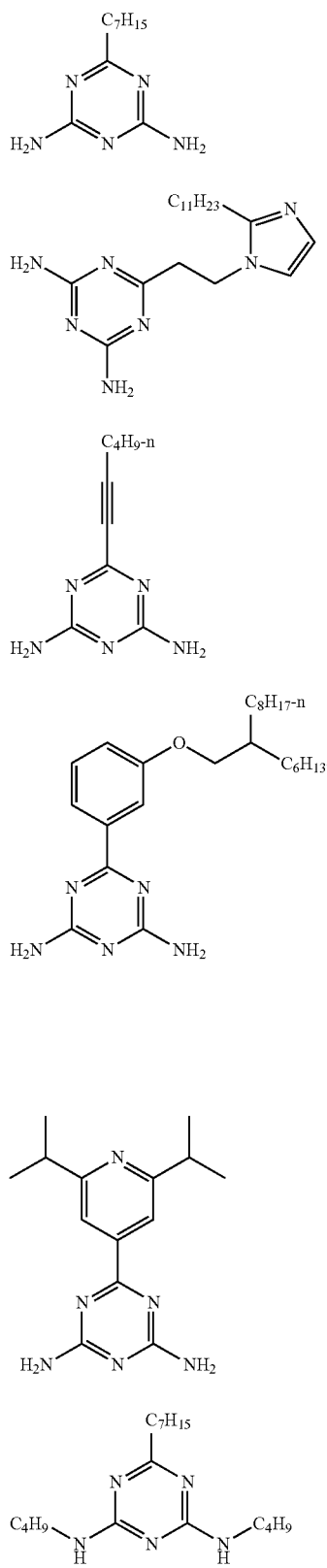
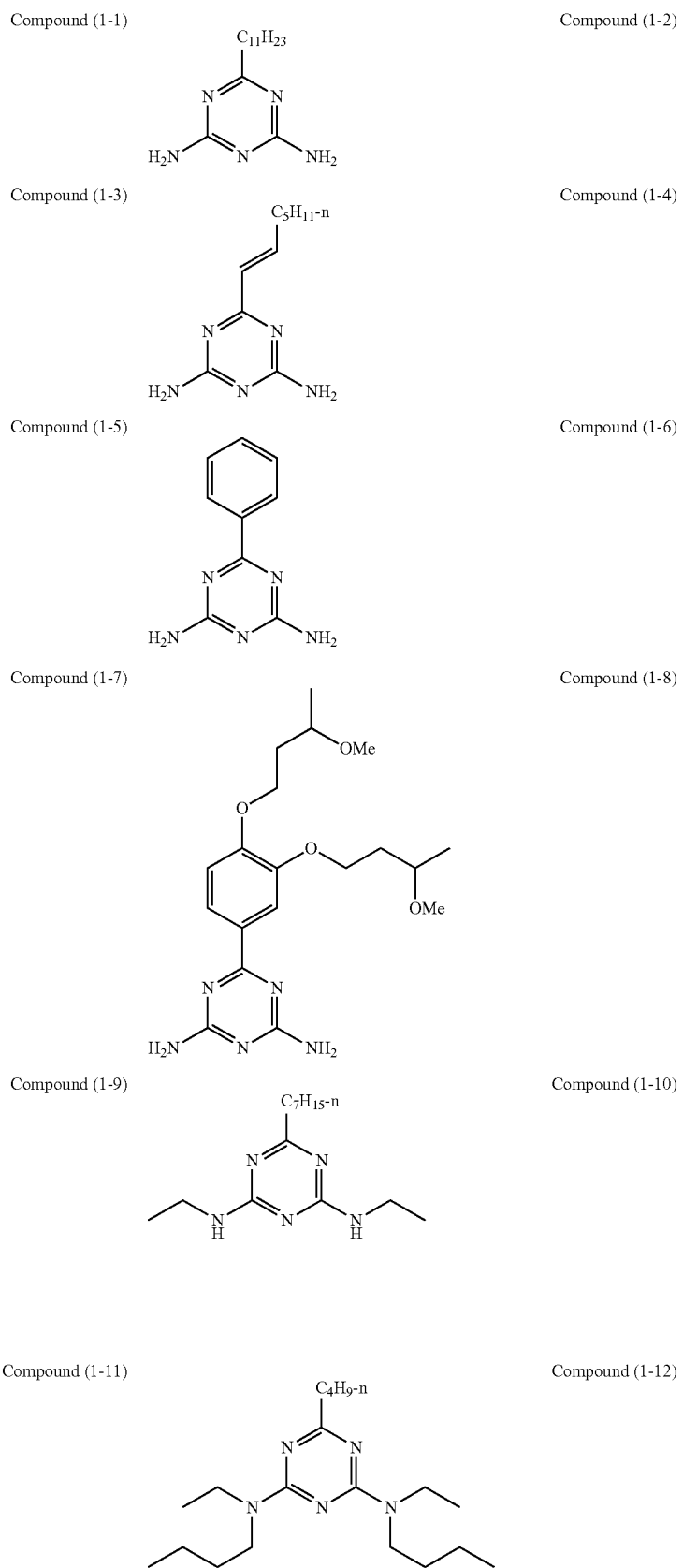
Compound (1-1)
Compound (1-2)
Compound (1-3)
Compound (1-4)
Compound (1-5)
Compound (1-6)
Compound (1-7)
Compound (1-8)
Compound (1-9)
Compound (1-10)
Compound (1-11)
Compound (1-12)

-continued
Compound (1-13)
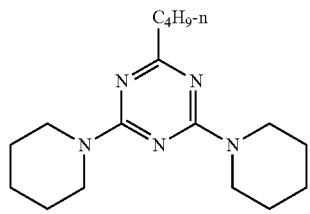
Compound (1-14)
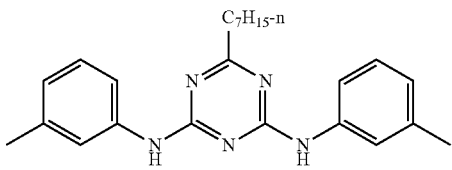
Compound (1-15)
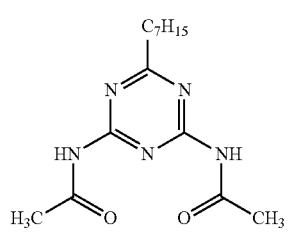
Compound (2-1)
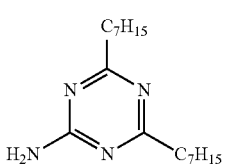
Compound (2-2)
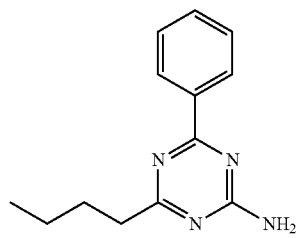
Compound (3-1)
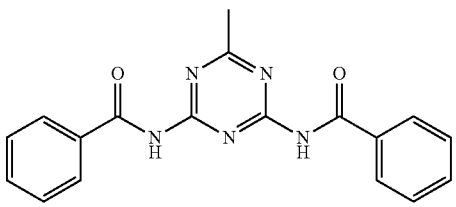
Compound (3-2)
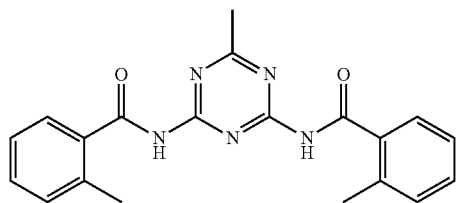
Compound (3-3)
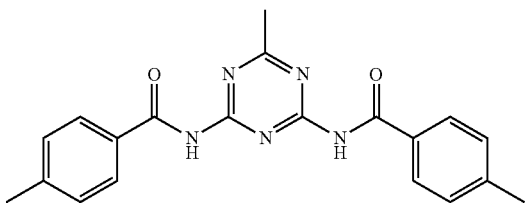
Compound (3-4)
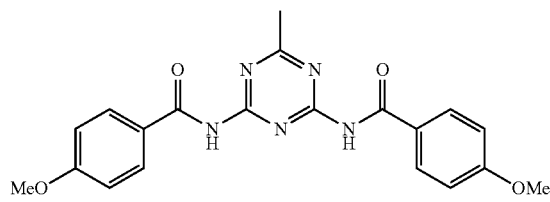
Compound (3-5)
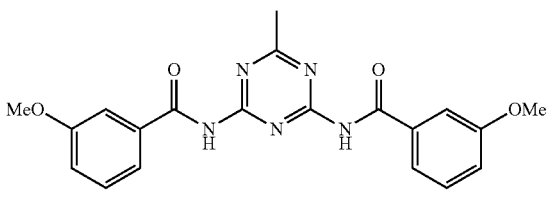
Compound (3-6)
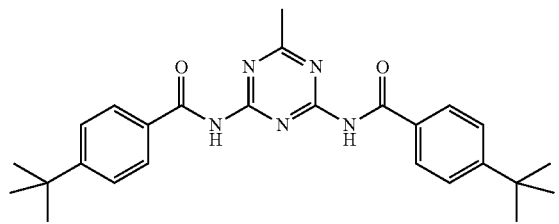
Compound (3-7)
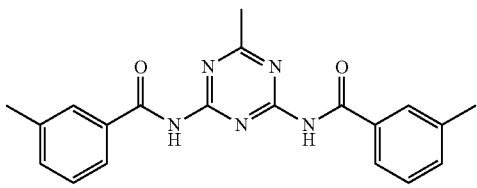

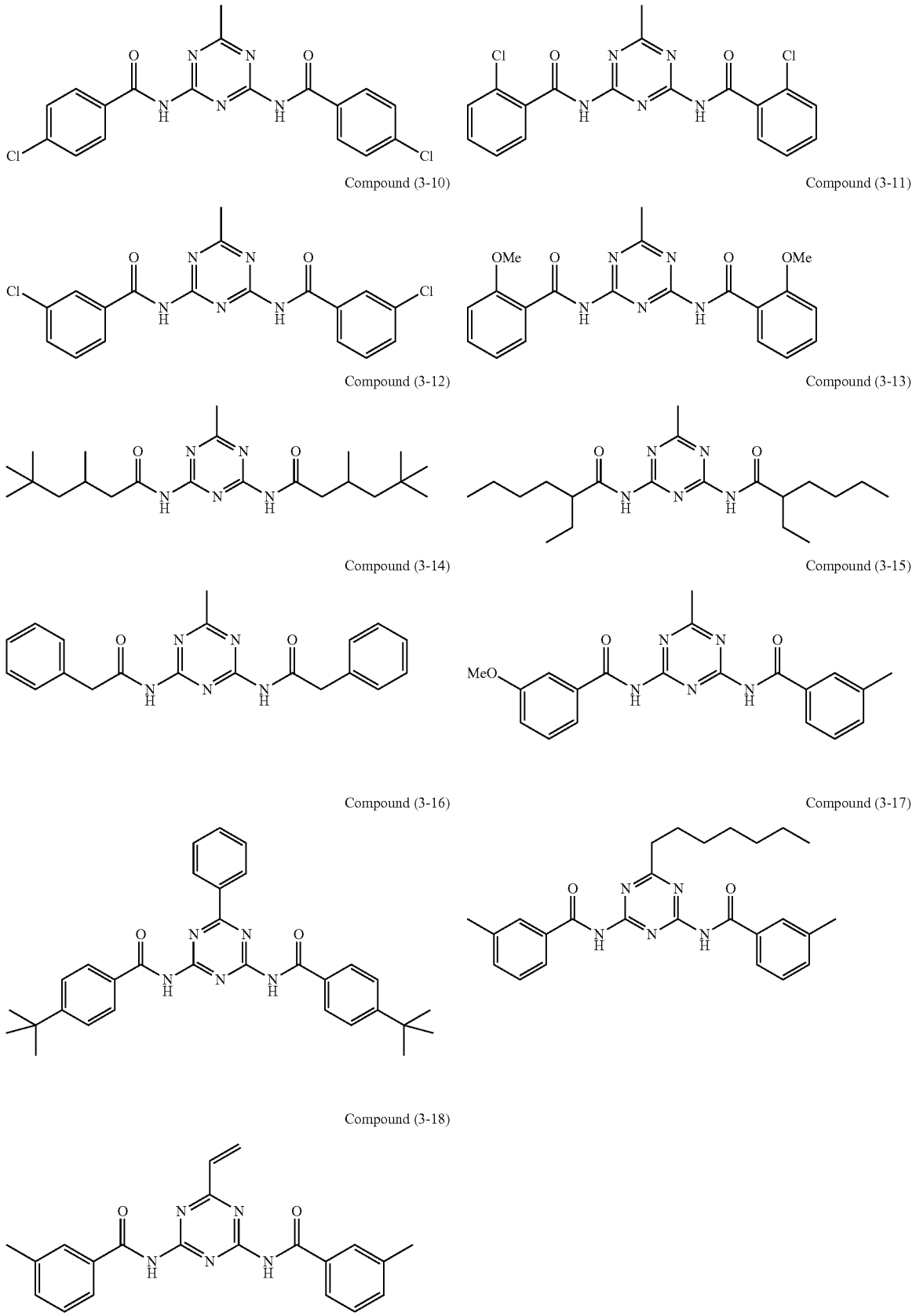

-continued

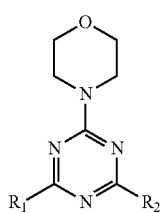

| | | |
|---|---|---|
| R₁ = *—NH₂ | R₂ = *—NH₂ | Compound (4-1) |
| R₁ = *—NHMe | R₂ = *—NH₂ | Compound (4-2) |
| R₁ = *—NHEt | R₂ = *—NH₂ | Compound (4-3) |
| R₁ = *—NHMe | R₂ = *—NHMe | Compound (4-4) |
| R₁ = *—NHMe | R₂ = *—NHEt | Compound (4-5) |
| R₁ = *—NHEt | R₂ = *—NHEt | Compound (4-6) |
| R₁ = *—NHMe | R₂ = *—NH—C(=O)—(3-methylphenyl) | Compound (4-7) |
| R₁ = *—NHMe | R₂ = *—NH—phenyl | Compound (4-8) |
| R₁ = *—NHMe | R₂ = *—NH—(2-pyridyl) | Compound (4-9) |
| R₁ = *—NHMe | R₂ = *—NH—(4-methylphenyl) | Compound (4-10) |

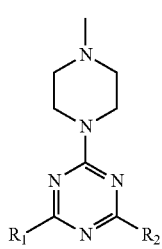

| | | |
|---|---|---|
| R₁ = *—NH₂ | R₂ = *—NH₂ | Compound (4-11) |
| R₁ = *—NHMe | R₂ = *—NH₂ | Compound (4-12) |
| R₁ = *—NHEt | R₂ = *—NH₂ | Compound (4-13) |
| R₁ = *—NHMe | R₂ = *—NHMe | Compound (4-14) |
| R₁ = *—NHMe | R₂ = *—NHEt | Compound (4-15) |
| R₁ = *—NHEt | R₂ = *—NHEt | Compound (4-16) |
| R₁ = *—NHMe | R₂ = *—NH—C(=O)—(3-methylphenyl) | Compound (4-17) |
| R₁ = *—NHMe | R₂ = *—NH—phenyl | Compound (4-18) |
| R₁ = *—NHMe | R₂ = *—NH—(2-pyridyl) | Compound (4-19) |
| R₁ = *—NHMe | R₂ = *—NH—(3-methylphenyl) | Compound (4-20) |

-continued

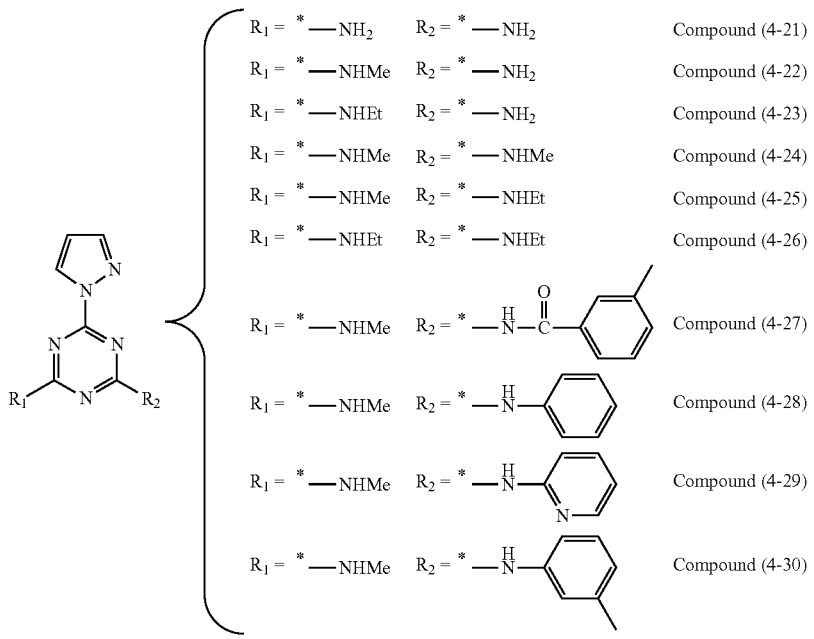

| | | |
|---|---|---|
| R₁ = *—NH₂ | R₂ = *—NH₂ | Compound (4-21) |
| R₁ = *—NHMe | R₂ = *—NH₂ | Compound (4-22) |
| R₁ = *—NHEt | R₂ = *—NH₂ | Compound (4-23) |
| R₁ = *—NHMe | R₂ = *—NHMe | Compound (4-24) |
| R₁ = *—NHMe | R₂ = *—NHEt | Compound (4-25) |
| R₁ = *—NHEt | R₂ = *—NHEt | Compound (4-26) |
| R₁ = *—NHMe | R₂ = *—NHC(O)-(m-tolyl) | Compound (4-27) |
| R₁ = *—NHMe | R₂ = *—NHPh | Compound (4-28) |
| R₁ = *—NHMe | R₂ = *—NH-(2-pyridyl) | Compound (4-29) |
| R₁ = *—NHMe | R₂ = *—NH-(m-tolyl) | Compound (4-30) |

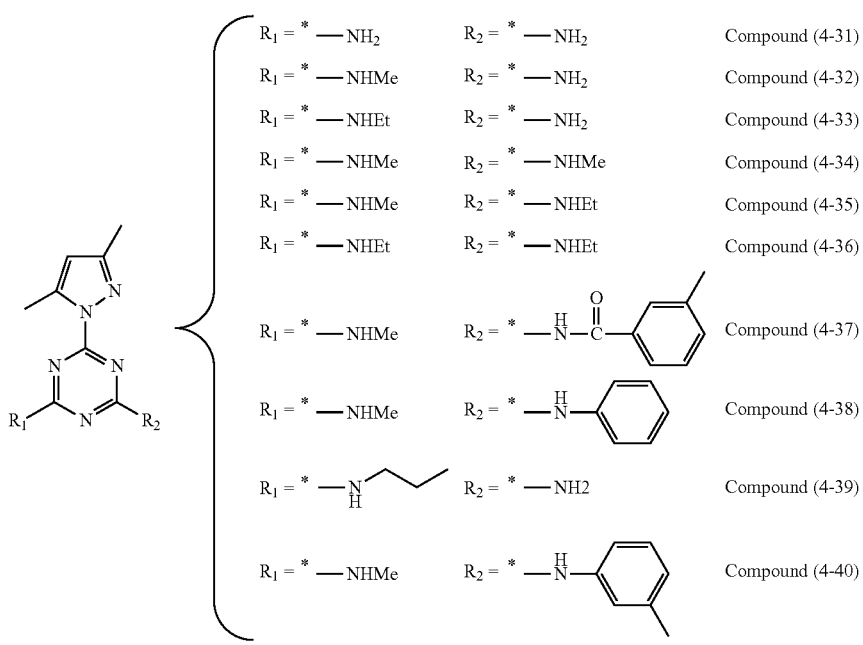

| | | |
|---|---|---|
| R₁ = *—NH₂ | R₂ = *—NH₂ | Compound (4-31) |
| R₁ = *—NHMe | R₂ = *—NH₂ | Compound (4-32) |
| R₁ = *—NHEt | R₂ = *—NH₂ | Compound (4-33) |
| R₁ = *—NHMe | R₂ = *—NHMe | Compound (4-34) |
| R₁ = *—NHMe | R₂ = *—NHEt | Compound (4-35) |
| R₁ = *—NHEt | R₂ = *—NHEt | Compound (4-36) |
| R₁ = *—NHMe | R₂ = *—NHC(O)-(m-tolyl) | Compound (4-37) |
| R₁ = *—NHMe | R₂ = *—NHPh | Compound (4-38) |
| R₁ = *—NH-nPr | R₂ = *—NH2 | Compound (4-39) |
| R₁ = *—NHMe | R₂ = *—NH-(m-tolyl) | Compound (4-40) |

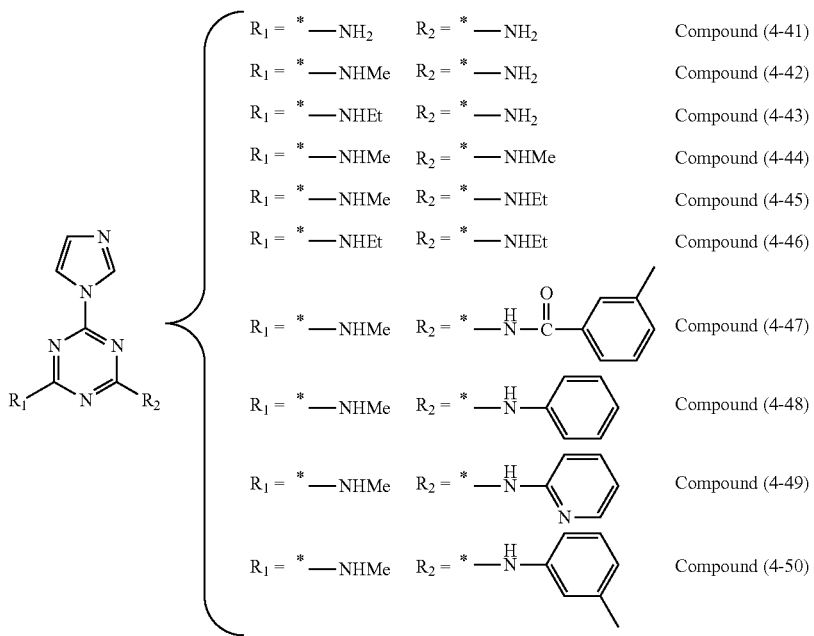

| | | |
|---|---|---|
| R₁ = *—NH₂ | R₂ = *—NH₂ | Compound (4-41) |
| R₁ = *—NHMe | R₂ = *—NH₂ | Compound (4-42) |
| R₁ = *—NHEt | R₂ = *—NH₂ | Compound (4-43) |
| R₁ = *—NHMe | R₂ = *—NHMe | Compound (4-44) |
| R₁ = *—NHMe | R₂ = *—NHEt | Compound (4-45) |
| R₁ = *—NHEt | R₂ = *—NHEt | Compound (4-46) |
| R₁ = *—NHMe | R₂ = *—NHC(O)-(3-methylphenyl) | Compound (4-47) |
| R₁ = *—NHMe | R₂ = *—NH-phenyl | Compound (4-48) |
| R₁ = *—NHMe | R₂ = *—NH-(2-pyridyl) | Compound (4-49) |
| R₁ = *—NHMe | R₂ = *—NH-(3-methylphenyl) | Compound (4-50) |

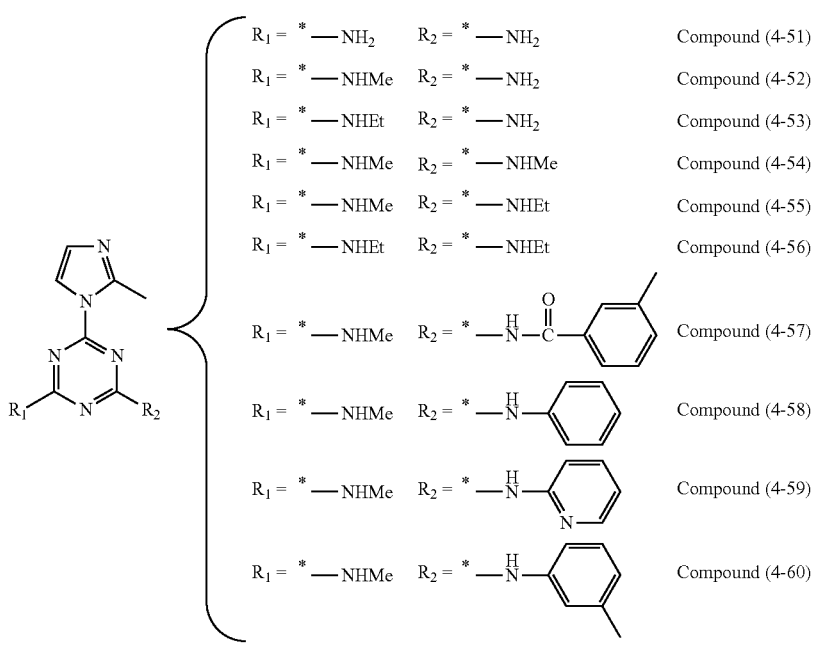

| | | |
|---|---|---|
| R₁ = *—NH₂ | R₂ = *—NH₂ | Compound (4-51) |
| R₁ = *—NHMe | R₂ = *—NH₂ | Compound (4-52) |
| R₁ = *—NHEt | R₂ = *—NH₂ | Compound (4-53) |
| R₁ = *—NHMe | R₂ = *—NHMe | Compound (4-54) |
| R₁ = *—NHMe | R₂ = *—NHEt | Compound (4-55) |
| R₁ = *—NHEt | R₂ = *—NHEt | Compound (4-56) |
| R₁ = *—NHMe | R₂ = *—NHC(O)-(3-methylphenyl) | Compound (4-57) |
| R₁ = *—NHMe | R₂ = *—NH-phenyl | Compound (4-58) |
| R₁ = *—NHMe | R₂ = *—NH-(2-pyridyl) | Compound (4-59) |
| R₁ = *—NHMe | R₂ = *—NH-(3-methylphenyl) | Compound (4-60) |

-continued

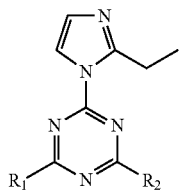

| | | |
|---|---|---|
| R₁ = *—NH₂ | R₂ = *—NH₂ | Compound (4-61) |
| R₁ = *—NHMe | R₂ = *—NH₂ | Compound (4-62) |
| R₁ = *—NHEt | R₂ = *—NH₂ | Compound (4-63) |
| R₁ = *—NHMe | R₂ = *—NHMe | Compound (4-64) |
| R₁ = *—NHMe | R₂ = *—NHEt | Compound (4-65) |
| R₁ = *—NHEt | R₂ = *—NHEt | Compound (4-66) |
| R₁ = *—NHMe | R₂ = *—NH—C(=O)—(m-tolyl) | Compound (4-67) |
| R₁ = *—NHMe | R₂ = *—NH—Ph | Compound (4-68) |
| R₁ = *—NHMe | R₂ = *—NH—(2-pyridyl) | Compound (4-69) |
| R₁ = *—NHMe | R₂ = *—NH—(p-tolyl) | Compound (4-70) |

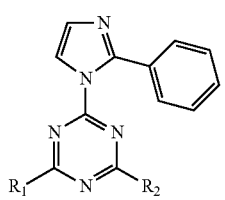

| | | |
|---|---|---|
| R₁ = *—NH₂ | R₂ = *—NH₂ | Compound (4-71) |
| R₁ = *—NHMe | R₂ = *—NH₂ | Compound (4-72) |
| R₁ = *—NHEt | R₂ = *—NH₂ | Compound (4-73) |
| R₁ = *—NHMe | R₂ = *—NHMe | Compound (4-74) |
| R₁ = *—NHMe | R₂ = *—NHEt | Compound (4-75) |
| R₁ = *—NHEt | R₂ = *—NHEt | Compound (4-76) |
| R₁ = *—NHMe | R₂ = *—NH—C(=O)—(m-tolyl) | Compound (4-77) |
| R₁ = *—NHMe | R₂ = *—NH—Ph | Compound (4-78) |
| R₁ = *—NHMe | R₂ = *—NH—(2-pyridyl) | Compound (4-79) |
| R₁ = *—NHMe | R₂ = *—NH—(m-tolyl) | Compound (4-80) |

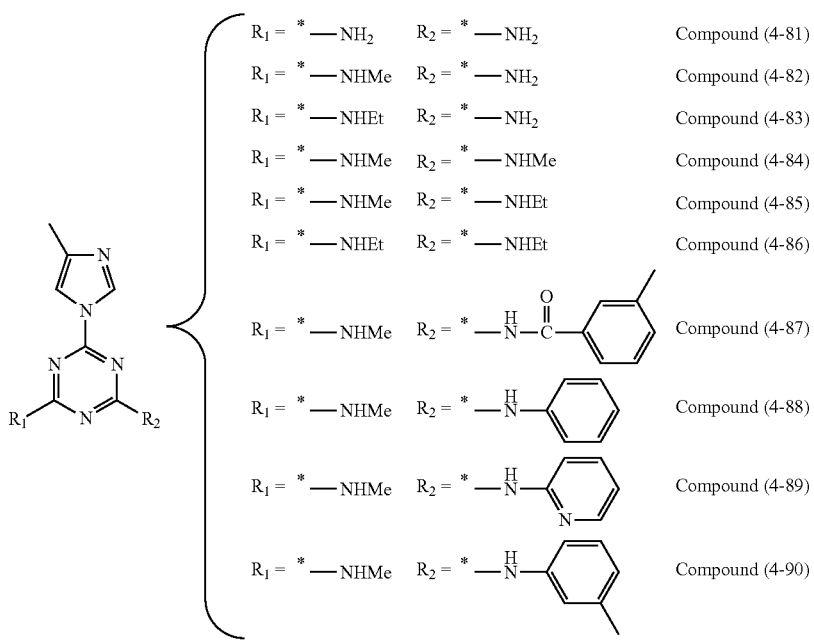

| | | |
|---|---|---|
| R₁ = *—NH₂ | R₂ = *—NH₂ | Compound (4-81) |
| R₁ = *—NHMe | R₂ = *—NH₂ | Compound (4-82) |
| R₁ = *—NHEt | R₂ = *—NH₂ | Compound (4-83) |
| R₁ = *—NHMe | R₂ = *—NHMe | Compound (4-84) |
| R₁ = *—NHMe | R₂ = *—NHEt | Compound (4-85) |
| R₁ = *—NHEt | R₂ = *—NHEt | Compound (4-86) |
| R₁ = *—NHMe | R₂ = *—NH–C(=O)–(3-methylphenyl) | Compound (4-87) |
| R₁ = *—NHMe | R₂ = *—NH–phenyl | Compound (4-88) |
| R₁ = *—NHMe | R₂ = *—NH–(2-pyridyl) | Compound (4-89) |
| R₁ = *—NHMe | R₂ = *—NH–(3-methylphenyl) | Compound (4-90) |

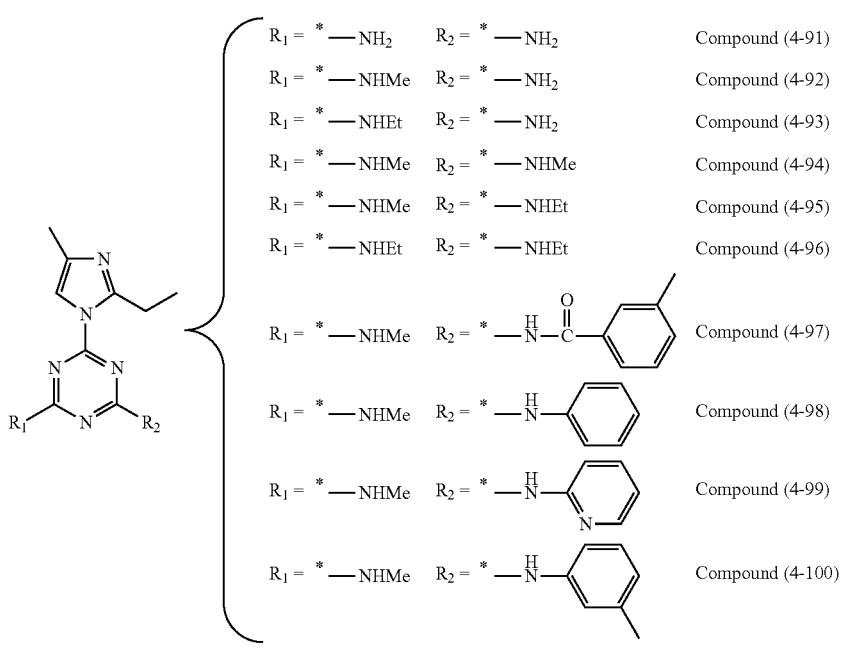

| | | |
|---|---|---|
| R₁ = *—NH₂ | R₂ = *—NH₂ | Compound (4-91) |
| R₁ = *—NHMe | R₂ = *—NH₂ | Compound (4-92) |
| R₁ = *—NHEt | R₂ = *—NH₂ | Compound (4-93) |
| R₁ = *—NHMe | R₂ = *—NHMe | Compound (4-94) |
| R₁ = *—NHMe | R₂ = *—NHEt | Compound (4-95) |
| R₁ = *—NHEt | R₂ = *—NHEt | Compound (4-96) |
| R₁ = *—NHMe | R₂ = *—NH–C(=O)–(3-methylphenyl) | Compound (4-97) |
| R₁ = *—NHMe | R₂ = *—NH–phenyl | Compound (4-98) |
| R₁ = *—NHMe | R₂ = *—NH–(2-pyridyl) | Compound (4-99) |
| R₁ = *—NHMe | R₂ = *—NH–(3-methylphenyl) | Compound (4-100) |

-continued

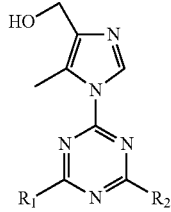

| | | |
|---|---|---|
| R₁ = *—NH₂ | R₂ = *—NH₂ | Compound (4-101) |
| R₁ = *—NHMe | R₂ = *—NH₂ | Compound (4-102) |
| R₁ = *—NHEt | R₂ = *—NH₂ | Compound (4-103) |
| R₁ = *—NHMe | R₂ = *—NHMe | Compound (4-104) |
| R₁ = *—NHMe | R₂ = *—NHEt | Compound (4-105) |
| R₁ = *—NHEt | R₂ = *—NHEt | Compound (4-106) |
| R₁ = *—NHMe | R₂ = *—NH-C(=O)-(m-tolyl) | Compound (4-107) |
| R₁ = *—NHMe | R₂ = *—NH-phenyl | Compound (4-108) |
| R₁ = *—NHMe | R₂ = *—NH-(2-pyridyl) | Compound (4-109) |
| R₁ = *—NHMe | R₂ = *—NH-(m-tolyl) | Compound (4-100) |

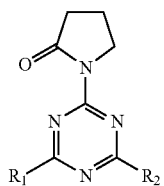

| | | |
|---|---|---|
| R₁ = *—NH₂ | R₂ = *—NH₂ | Compound (4-111) |
| R₁ = *—NHMe | R₂ = *—NH₂ | Compound (4-112) |
| R₁ = *—NHEt | R₂ = *—NH₂ | Compound (4-113) |
| R₁ = *—NHMe | R₂ = *—NHMe | Compound (4-114) |
| R₁ = *—NHMe | R₂ = *—NHEt | Compound (4-115) |
| R₁ = *—NHEt | R₂ = *—NHEt | Compound (4-116) |
| R₁ = *—NHMe | R₂ = *—NH-C(=O)-(m-tolyl) | Compound (4-117) |
| R₁ = *—NHMe | R₂ = *—NH-phenyl | Compound (4-118) |
| R₁ = *—NHMe | R₂ = *—NH-(2-pyridyl) | Compound (4-119) |
| R₁ = *—NHMe | R₂ = *—NH-(m-tolyl) | Compound (4-120) |

* is the linking site to the 1,3,5-triazine ring.

(1-2) Retardation Reducer:

One of the preferred embodiments of the invention is that the compound represented by the formula (1) or (2) serves as a humidity dependence improver for polymer film and additionally serves as a retardation reducer. Heretofore, compounds similar to the compounds of the formula (1) or (2), for example, compounds having a 1,3,5-triazine and having at least two (preferably at least three) aromatic rings are used as a retardation enhancer for cellulose acylate film. The present inventors have found out compounds capable of favorably exhibiting a humidity dependence improving effect for polymer film from the above-mentioned compounds having a 1,3,5-triazine ring and have additionally found out compounds exhibiting a humidity dependence improving effect and an Rth-reducing effect. Specifically, one preferred embodiment of the cellulose acylate film to which the humidity dependence improver for polymer film is added in the invention is characterized in that Rth of the film is smaller than that of the film to which the additive is not added.

The compound of the formula (1) or (2) serving as a retardation reducer is, for example, the compound of the formula (6) where $Ra^3$ is an alkyl group, or the compound of the formula (9) where $Rb^3$ and $Rc^3$ are both alkyl groups; however, the case should not be limited to the structures exemplified here.

(1-3) Physical Properties:

Preferably, the compound of the formula (1) or (2) has a molecular weight of from 100 to 2000, more preferably from 150 to 1500, even more preferably from 170 to 1000.

(1-4) Amount to be Added:

The amount of the compound of the formula (1) or (2) to be added here is preferably at most 50 parts by mass relative to 100 parts by mass of the polymer film substrate, more preferably from 0.1 to 30 parts by mass, even more preferably from 0.5 to 20 parts by mass, still more preferably from 1 to 15 parts by mass. In that manner the compound of the formula (1) or (2) can sufficiently improve the humidity dependence of polymer film when its amount added is smaller amount than that of the humidity dependence improver heretofore reported in the art.

(1-5) Method for Production of Compound of Formula (1) or Formula (2):

The method for producing the compound of the formula (1) or (2) to be contained in the humidity dependence improver for polymer film of the invention is not specifically defined, and the compound may be produced in any known method. As the production method preferably used in the invention, for example, there may be mentioned a method of heating dicyandiamide and a nitrile compound in an alcohol in the presence of an inorganic base such as potassium hydroxide to form a triazine ring, as in U.S. Pat. No. 3,478,026 and Chem. Eur. J. 2005, 11, 6616-6628; a method starting from cyanuric chloride where the starting compound is stepwise processed for substitution reaction with a Grignard compound and an amine compound, as in Tetrahedron 2000, 56, 9705-9711; or a method of synthesizing a monoamino-di-substituted-s-triazine through reaction of imidoylguanidine with a carboxylic chloride or ester, as in the Journal of Organic Synthetic Chemistry Association of Japan, 1967, Vol. 25, No. 11, 1048-1051.

The compound of the formula (1) or (2) may be commercially available.

(1-6) Other Ingredient than the Compound of Formula (1) or Formula (2):

Not contradictory to the scope and the sprit of the invention, any other ingredient than the compound of the formula (1) or (2) may be contained in the humidity dependence improver for polymer film of the invention. The other ingredient includes a solvent (organic solvent) capable of dissolving the compound of the formula (1) or (2), a binder, a polymer plasticizer.

The humidity dependence improver for polymer film of the invention may be commercially available.

2. Polymer Film:

The humidity dependence improver for polymer film of the invention (in this, the polymer film may be referred to as the film of the invention) is favorably used for a polymer having a hydroxyl group. The polymer having a hydroxyl group includes a polyvinyl alcohol and its modificates and a cellulose acylate resin. The polymer having a hydroxyl group includes a derivative in which the hydroxyl group is substituted with any other substituent, and for example, a cellulose acylate resin in which all the hydroxyl groups are substituted with acyl groups is within the scope of the above-mentioned polymer having a hydroxyl group.

(Cellulose Acylate Film)

The humidity dependence improver for polymer film of the invention is especially favorably used as a humidity dependence improver for cellulose acylate film among polymer film. The cellulose acylate film is described in detail below.

In the case where the polymer film in the invention is a cellulose acylate film, the film is characterized by containing a compound of the formula (1) or (2) and a cellulose acylate resin.

Preferred embodiments of the film of the invention are described below.

(2-1) Amount of Humidity Dependence Improver to be Added in the Invention:

In the film of the invention, preferably, the amount of the compound of the formula (1) or (2) is at most 30 parts by mass relative to 100 parts by mass of the cellulose acylate resin therein, more preferably from 0.1 to 30 parts by mass, even more preferably from 0.5 to 20 parts by mass, still more preferably from 1 to 15 parts by mass.

Also preferably, the total content of the humidity dependence improver in the film of the invention is at most 35% by mass relative to 100 parts by mass of the cellulose acylate resin therein, more preferably at most 30 parts by mass, even more preferably at most 20 parts by mass. The humidity dependence improver is not limited to the compound of the formula (1) or (2) or a compound having a 1,3,5-triazine ring.

(2-2) Cellulose Acylate Resin:

The film of the invention contains a cellulose acylate resin. Preferably, the film of the invention contains a cellulose acylate resin as the main ingredient thereof. The wording "as the main ingredient" as referred to herein means as follows: When the cellulose acylate film comprises one cellulose acylate resin as the material thereof, the main ingredient is that one cellulose acylate resin; and when the film comprises two or more kinds of cellulose acylate resins, then the cellulose acylate resin having the highest mass fraction of those two or more cellulose acylate resins is the main ingredient. Cellulose has free hydroxyl groups at the 2-, 3- and 6-positions per the β-1,4-bonding glucose unit therein.

The starting cellulose for cellulose acylate includes cotton linter, wood pulp (hardwood pulp, softwood pulp), etc.; and any cellulose acylate resin starting from any type of cellulose is usable herein, and as the case may be, two or more kinds of cellulose acylate resins may be mixed for use here. The starting cellulose is described in detail, for example, in Marusawa & Uda's "Plastic Material Course (17), Cellulose Resin" by Nikkan Kogyo Shinbun (issued 1970), and Hatsumei Kyokai Disclosure Bulletin No. 2001-1745 (pp. 7-8); and various types of cellulose disclosed in these are usable here with no specific limitation thereon for use for the cellulose acylate film in the invention.

For the cellulose acylate film, the acyl group in the cellulose acylate resin is not specifically defined, but is preferably an acetyl group, a propionyl group or a butyryl group, more preferably an acetyl group.

Concretely, it is desirable that the film contains a cellulose acylate satisfying all the following formulae (i) to (iii):

$$2.0 \leq A+B \leq 3 \quad \text{(i)}$$

$$1.0 \leq A \leq 3 \quad \text{(ii)}$$

$$0 \leq B \leq 1.0. \quad \text{(iii)}$$

In the formulae (i) to (iii), A means the degree of substitution with an acetyl group, and B means a total of the degree of substitution with a propionyl group and the degree of substitution with a butyryl group.

More preferably, the degree of acyl substitution in the cellulose acylate resin for the cellulose acylate film satisfies all the following formulae (iv) to (vi):

$$2.0 \leq A+B \leq 3, \quad \text{(iv)}$$

$$1.5 \leq A \leq 3, \quad \text{(v)}$$

$$B=0. \quad \text{(vi)}$$

In the formulae (iv) to (vi), A means the degree of substitution with an acetyl group, and B means a total of the degree of substitution with a propionyl group and the degree of substitution with a butyryl group.
Preferred examples of the humidity dependence improver of the invention are mentioned below. In addition to them, Compounds (3-1), (3-5) to (3-7), (3-10) and (3-15) are also preferable.
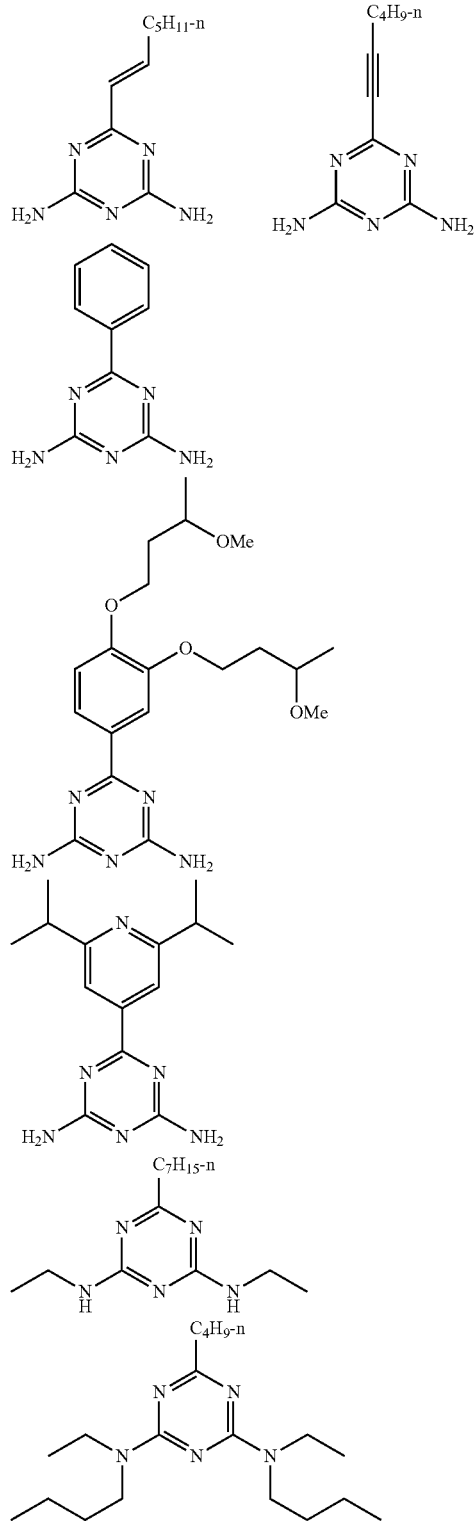
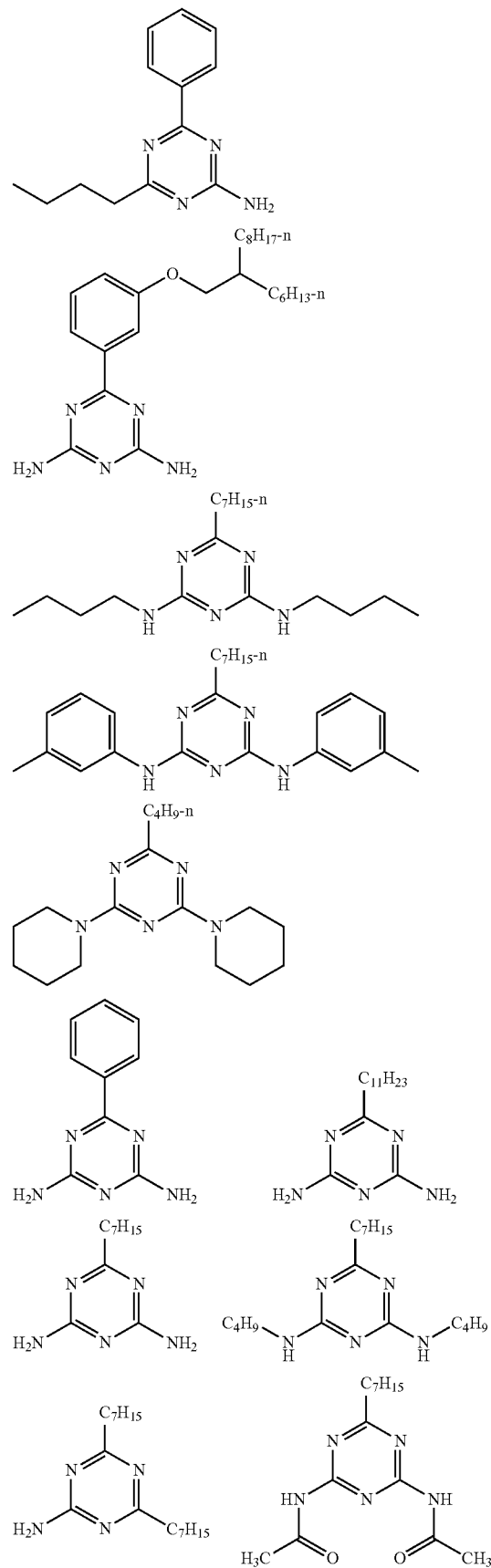

-continued

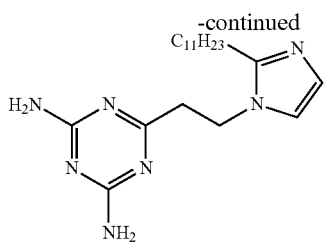

The degree of acetyl substitution, the degree of propionyl substitution and the degree of butyryl substitution in the cellulose acylate resin each mean the degree of acetylation and the degree of propionylation and/or butyrylation, respectively, of the three hydroxyl groups existing in the constitutive unit ((β)-1,4-glycoside bonding glucose) in cellulose. In this specification, the degree of substitution with an acetyl group, a propionyl group and a butyryl group in the cellulose acylate resin may be computed by measuring the amount of the bonding fatty acid per the constitutive unit mass of cellulose. The measurement may be attained according to "ASTM D817-91".

Preferably, the cellulose acylate resin has a degree of polymerization of from 350 to 800, more preferably a degree of polymerization of from 370 to 600. Also preferably, the cellulose acylate resin for use in the invention has a number-average molecular weight of from 70000 to 230000, more preferably a number-average molecular weight of from 75000 to 230000, even more preferably a number-average molecular weight of from 78000 to 120000.

The cellulose acylate resin may be produced, using an acid anhydride or an acid chloride as the acylating agent. A most popular production method on an industrial scale is as follows: Cellulose obtained from cotton linter or wood pulp is esterified with a mixed organic acid component containing an organic acid (acetic acid, propionic acid, butyric acid) corresponding to the intended acetyl group and the propionyl group and/or the butyryl group or its acid anhydride (acetic anhydride, propionic anhydride, butyric anhydride) thereby producing the intended cellulose acylate resin.

(2-3) Other Additives:

The polymer film of the invention may contain any other additive than the compound of the formula (1) or (2) for various purposes. When the polymer ester film is produced according to a solvent-casting method, the additive may be added to a polymer resin dope, for example, a cellulose acylate dope. The timing of addition is not specifically defined. The additive is selected from those miscible with polymer (e.g., cellulose acylate), and soluble in a cellulose acylate dope in a solvent-casting method. The additive is added for the purpose of regulating the optical properties of the polymer film and for regulating other properties thereof.

(Plasticizer)

The polymer film of the invention preferably contains a plasticizer for enhancing the film formability thereof. As the plasticizer, preferred are saccharide-type plasticizers selected from a group of compounds of saccharides and their derivatives, or oligomer-type plasticizers selected from oligomers of polycondensate esters of dicarboxylic acids and diols and their derivatives, as enhancing the environmental humidity resistance of the polymer film. Concretely, the plasticizer of the type can reduce humidity-dependent Rth fluctuation of film. When both such a saccharide-type plasticizer and an oligomer-type plasticizer are used simultaneously, the effect thereof for reducing the humidity-dependent Rth fluctuation of film could be high.

(Saccharide-Type Plasticizer)

As described in the above, the polymer film of the invention preferably contains at least one compound selected from a group consisting of saccharides and their derivatives. Above all, compounds selected from a group of monomeric to 10-meric saccharides and their derivatives are especially preferred for the plasticizer. Their examples include saccharide derivatives in which a part or all of the hydrogen atoms of OH's in saccharides such as glucose or the like are substituted with acyl groups, as described in WO2007/125764, [0042]-[0065]. The amount of the saccharide-type plasticizer to be added is preferably from 0.1% by mass to less than 70% by mass relative to the main ingredient, cellulose acylate, more preferably from 1% by mass to less than 65% by mass, even more preferably from 1% by mass to less than 60% by mass.

(Oligomer-Type Plasticizer)

As describe in the above, the polymer film of the invention preferably contains an oligomer-type plasticizer selected from oligomers. Preferred examples of the oligomer-type plasticizer include polycondensates of a diol component and a dicarboxylic acid component and their derivatives (hereinafter this may be referred to as "polycondensate ester-type plasticizer"), as well as oligomers of methyl acrylate (MA) and their derivatives (hereinafter this may be referred to as "MA oligomer-type plasticizer").

The polycondensate ester is an polycondensate ester of a dicarboxylic acid component and a diol component. The dicarboxylic acid component may be only one type of a dicarboxylic acid or may be a mixture of two or more different kinds of dicarboxylic acids. Above all, as the dicarboxylic acid component, preferred is a dicarboxylic acid component containing at least one aromatic dicarboxylic acid and at least one aliphatic dicarboxylic acid. On the other hand, the diol component may be only one type of a diol component or may be a mixture of two or more different kinds of dials. Above all, the diol component is preferably ethylene glycol and/or an aliphatic diol having a mean carbon number of from more than 2.0 to 3.0.

Regarding the ratio of the aromatic dicarboxylic acid to the aliphatic dicarboxylic acid in the dicarboxylic acid component, the proportion of the aromatic dicarboxylic acid therein is preferably from 5 to 70 mol %. Within the range, the plasticizer is effective for reducing the environmental humidity dependence of the optical properties of film and the plasticizer could be prevented from bleeding out during film formation. The proportion of the aromatic dicarboxylic acid in the dicarboxylic acid component is more preferably from 10 to 60 mol %, even more preferably from 20 to 50 mol %.

Examples of the aromatic dicarboxylic acid include phthalic acid, terephthalic acid, isophthalic acid, 1,5-naphthalenedicarboxylic acid, 1,4-naphthalenedicarboxylic acid, 1,8-naphthalenedicarboxylic acid, 2,8-naphthalenedicarboxylic acid, 2,6-naphthalenedicarboxylic acid, etc.; and preferred are phthalic acid and terephthalic acid. Examples of the aliphatic dicarboxylic acid include oxalic acid, malonic acid, succinic acid, maleic acid, fumaric acid, glutaric acid, adipic acid, pimelic acid, suberic acid, azelaic acid, sebacic acid, dodecanedicarboxylic acid, 1,4-cyclohexanedicarboxylic acid, etc.; and above all, preferred are succinic acid and adipic acid.

The diol component is preferably ethylene glycol and/or a diol having a mean carbon number of from more than 2.0 to 3.0. In the diol component, the proportion of ethylene glycol is preferably at least 50 mol %, more preferably at least 75 mol %. The aliphatic diol may be an alkyl diol or an alicyclic diol, including, for example, ethylene glycol, 1,2-propanediol, 1,3-propanediol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-dimethylolheptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol, diethylene glycol, etc; and preferably, these are used as a mixture of one or more of them with ethylene glycol.

For the diol component, preferred are ethylene glycol, 1,2-propanediol and 1,3-propanediol; and more preferred are ethylene glycol and 1,2-propanediol.

The polycondensate ester-type plasticizer is preferably a derivative of a polycondensate ester in which the terminal OH forms an ester with a monocarboxylic acid. The monocarboxylic acid for terminating the terminal OH groups of the ester is preferably an aliphatic monocarboxylic acid, more preferably acetic acid, propionic acid, butanoic acid, benzoic acid or their derivative, even more preferably acetic acid or propionic acid, most preferably acetic acid. When the carbon number of the monocarboxylic acid for use to terminate the polycondensate ester is at most 3, then the loss on heat of the compound is not large and the surface defect of the film may be reduced. Two or more different types of monocarboxylic acids may be used as a mixture for the termination. Preferably, the terminals of the polycondensate ester are terminated with acetic acid or propionic acid; and more preferably, the terminals of the polycondensate ester derivative are both acetyl ester residues formed through termination with acetic acid.

Preferably, the polycondensate ester and its derivative are oligomers having a number-average molecular weight of from 700 to 2000 or so, more preferably from 800 to 1500 or so, even more preferably from 900 to 1200 or so. The number-average molecular weight of the polycondensate ester may be measured and evaluated through gel permeation chromatography.

Table 1 below shows specific examples of polycondensate ester-type plasticizers, to which, however, the invention should not be limited.

TABLE 1

| | Dicarboxylic Acid*1) | | | Diol |
| --- | --- | --- | --- | --- |
| | Aromatic Dicarboxylic Acid | Aliphatic Dicarboxylic Acid | Dicarboxylic Acid Ratio (mol %) | Aliphatic Diol |
| P-1 | PA | AA | 10/90 | ethylene glycol |
| P-2 | PA | AA | 25/75 | ethylene glycol |
| P-3 | PA | AA | 50/50 | ethylene glycol |
| P-4 | PA | SA | 5/95 | ethylene glycol |
| P-5 | PA | SA | 20/80 | ethylene glycol |
| P-6 | TPA | AA | 15/85 | ethylene glycol |
| P-7 | TPA | AA | 50/50 | ethylene glycol |
| P-8 | TPA | SA | 5/95 | ethylene glycol |
| P-9 | TPA | SA | 10/90 | ethylene glycol |
| P-10 | TPA | SA | 15/85 | ethylene glycol |
| P-11 | TPA | SA | 50/50 | ethylene glycol |
| P-12 | TPA | SA | 70/30 | ethylene glycol |
| P-13 | TPA/PA | AA | 10/10/80 | ethylene glycol |
| P-14 | TPA/PA | AA | 20/20/60 | ethylene glycol |
| P-15 | TPA/PA | AA/SA | 10/10/40/40 | ethylene glycol |
| P-16 | TPA | AA/SA | 10/30/60 | ethylene glycol |
| P-17 | TPA | AA/SA | 10/30/60 | ethylene glycol/1,2-propanediol |
| P-18 | TPA | AA/SA | 10/30/60 | 1,2-propanediol |
| P-19 | TPA | AA/SA | 10/30/60 | ethylene glycol |
| P-20 | TPA | AA/SA | 10/30/60 | ethylene glycol |
| P-21 | TPA | AA/SA | 10/30/60 | ethylene glycol |
| P-22 | TPA | AA/SA | 10/30/60 | ethylene glycol |
| P-23 | TPA | AA/SA | 10/30/60 | ethylene glycol |
| P-24 | TPA | AA/SA | 10/30/60 | ethylene glycol |
| P-25 | TPA | AA/SA | 10/30/60 | ethylene glycol |
| P-26 | TPA | AA/SA | 10/30/60 | ethylene glycol |
| P-27 | IPA | AA/SA | 20/40/40 | ethylene glycol |
| P-28 | 2.6-NPA | AA/SA | 20/40/40 | ethylene glycol |
| P-29 | 1.5-NPA | AA/SA | 20/40/40 | ethylene glycol |
| P-30 | 1.4-NPA | AA/SA | 20/40/40 | ethylene glycol |
| P-31 | 1.8-NPA | AA/SA | 20/40/40 | ethylene glycol |
| P-32 | 2.8-NPA | AA/SA | 20/40/40 | ethylene glycol |

| | Diol | | | |
| --- | --- | --- | --- | --- |
| | Diol Ratio (mol %) | Mean Carbon Number of Aliphatic Diol | Both Terminals | Number-Average Molecular Weight |
| P-1 | 100 | 2.0 | acetyl ester residue | 1000 |
| P-2 | 100 | 2.0 | acetyl ester residue | 1000 |
| P-3 | 100 | 2.0 | acetyl ester residue | 1000 |
| P-4 | 100 | 2.0 | acetyl ester residue | 1000 |
| P-5 | 100 | 2.0 | acetyl ester residue | 1000 |
| P-6 | 100 | 2.0 | acetyl ester residue | 1000 |

TABLE 1-continued

| | | | | |
|---|---|---|---|---|
| P-7 | 100 | 2.0 | acetyl ester residue | 1000 |
| P-8 | 100 | 2.0 | acetyl ester residue | 1000 |
| P-9 | 100 | 2.0 | acetyl ester residue | 1000 |
| P-10 | 100 | 2.0 | acetyl ester residue | 1000 |
| P-11 | 100 | 2.0 | acetyl ester residue | 1000 |
| P-12 | 100 | 2.0 | acetyl ester residue | 1000 |
| P-13 | 100 | 2.0 | acetyl ester residue | 1000 |
| P-14 | 100 | 2.0 | acetyl ester residue | 1000 |
| P-15 | 100 | 2.0 | acetyl ester residue | 1000 |
| P-16 | 100 | 2.0 | acetyl ester residue | 1000 |
| P-17 | 50/50 | 2.5 | acetyl ester residue | 1000 |
| P-18 | 100 | 3.0 | acetyl ester residue | 1000 |
| P-19 | 100 | 2.0 | acetyl ester residue | 700 |
| P-20 | 100 | 2.0 | acetyl ester residue | 850 |
| P-21 | 100 | 2.0 | acetyl ester residue | 1200 |
| P-22 | 100 | 2.0 | acetyl ester residue | 1600 |
| P-23 | 100 | 2.0 | acetyl ester residue | 2000 |
| P-24 | 100 | 2.0 | propionyl ester residue | 1000 |
| P-25 | 100 | 2.0 | butanoyl ester residue | 1000 |
| P-26 | 100 | 2.0 | benzoyl ester residue | 1000 |
| P-27 | 100 | 2.0 | acetyl ester residue | 1000 |
| P-28 | 100 | 2.0 | acetyl ester residue | 1200 |
| P-29 | 100 | 2.0 | acetyl ester residue | 1200 |
| P-30 | 100 | 2.0 | acetyl ester residue | 1200 |
| P-31 | 100 | 2.0 | acetyl ester residue | 1200 |
| P-32 | 100 | 2.0 | acetyl ester residue | 1200 |

*1)PA: phthalic acid, TPA: terephthalic acid, IPA: isophthalic acid, AA: adipic acid, SA: succinic acid, 2,6-NPA: 2,6-naphthalenedicarboxylic acid, 2,8-NPA: 2,8-naphthalenedicarboxylic acid, 1,5-NPA: 1,5-naphthalenedicarboxylic acid, 1,4-NPA: 1,4-naphthalenedicarboxylic acid, 1,8-NPA: 1,8-naphthalenedicarboxylic acid The polycondensate ester can be produced with ease according to any conventional method, for example, according to a polyesterification, interesterification or thermal-fusing condensation method of a dicarboxylic acid component and a diol component, or an interfacial condensation method of an acid chloride of a dicarboxylic acid component and a glycol. Polycondensate esters usable in the invention are described in detail in Koichi Murai, "Plasticizers and their Theory and Applications" (by Miyuki Shobo, 1st Ed., issued on Mar. 1, 1973). In addition, also usable herein are materials described JP-A 5-155809, 5-155810, 5-197073, 2006-259494, 7-330670, 2006-342227, 2007-003679.

The amount of the polycondensate ester-type plasticizer to be added is preferably from 0.1 to 70% by mass of the amount of the main ingredient, cellulose acylate, more preferably from 1 to 65% by mass, even more preferably from 3 to 60% by mass.

The content of the starting materials and the side products in the polycondensate ester-type plasticizer, concretely aliphatic diols, dicarboxylates, diol esters and others, that maybe in the film is preferably less than 1%, more preferably less than 0.5%. The dicarboxylate includes dimethyl phthalate, di(hydroxyethyl)phthalate, dimethyl terephthalate, di(hydroxyethyl)terephthalate, di(hydroxyethyl)adipate, di(hydroxyethyl)succinate, etc. The diol ester includes ethylene diacetate, propylene diacetate, etc.

As the plasticizer for use in the polymer film of the invention, also preferred is a methyl methacrylate (MA) oligomer-type plasticizer. Combination of the MA oligomer-type plasticizer and the above-mentioned saccharide-type plasticizer is also preferred. In the mode of combination use, the ratio by mass of the MA oligomer-type plasticizer to the saccharide-type plasticizer is preferably from 1/2 to 1/5, more preferably from 1/3 to 1/4. One example of the MA oligomer-type plasticizer is an oligomer containing the following recurring unit:

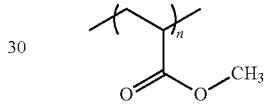

The weight-average molecular weight is preferably from 500 to 2000 or so, more preferably from 700 to 1500 or so, even more preferably from 800 to 1200 or so.

The MA oligomer-type plasticizer may be an MA homo-oligomer as well as an oligomer comprising the above-mentioned recurring unit derived from MA and at least one other recurring unit derived from any other monomer. Examples of the other monomer include ethyl acrylate, propyl (i-, n-) acrylate, butyl (n-, s-, t-) acrylate, pentyl (n-, s-) acrylate, hexyl (n-, i-) acrylate, heptyl (n-, i-) acrylate, octyl (n-, i-) acrylate, nonyl (n-, i-) acrylate, myristyl (n-, i-) acrylate, (2-ethylhexyl)acrylate, (ϵ-caprolactone)acrylate, (2-hydroxyethyl)acrylate, (2-hydroxypropyl)acrylate, (3-hydroxypropyl)acrylate, (4-hydroxybutyl)acrylate, (2-hydroxybutyl)acrylate, (2-methoxyethyl)acrylate, (2-ethoxyethyl)acrylate, and corresponding methacrylate monomers. In addition, also usable are monomers having an aromatic ring such as styrene, methylstyrene, hydroxystyrene, etc. As the other monomer, preferred are non-aromatic acrylate monomers and methacrylate monomers.

In the case where the MA oligomer-type plasticizer is an oligomer having two or more different kinds of recurring units, the oligomer preferably comprises X (monomer component having a hydrophilic group) and Y (monomer component free from hydrophilic groups), in which the ratio (by mol) of X/Y is from 1/1 to 1/99.

The MA oligomer may be produced with reference to the method described in JP-A 2003-12859.

(Polymer Plasticizer)

The polymer film of the invention may contain any other polymer plasticizer along with or in place of any one of the above-mentioned saccharide-type plasticizer, polycondensate ester-type plasticizer and MMA oligomer-type plasticizer. The other polymer plasticizer includes polyester-polyurethane plasticizers, aliphatic hydrocarbon polymers, alicyclic hydrocarbon polymers; vinylic polymers such as polyvinyl isobutyl ether, poly-N-vinylpyrrolidone, etc.; styrenic polymers such as polystyrene, poly-4-hydroxystyrene, etc.; polyethers such as polyethylene oxide, polypropylene oxide, etc.; polyamides, polyurethanes, polyureas, phenol-formaldehyde condensates, urea-formaldehyde condensates, polyvinyl acetate, etc.

(Compound Having at Least Two Aromatic Rings)

The polymer film of the invention may contain a compound having at least two aromatic rings, not contradictory to the scope and the sprit of the invention. The compound has an effect of regulating the optical properties of the polymer film. For example, when the polymer film of the invention is used as an optically-compensatory film, it is effectively stretched for regulating the optical properties, especially Re thereof to be on a desired level. For increasing Re thereof, the in-plane refractive anisotropy of the film must be increased, for which one method comprises regulating the main chain orientation by stretching. As combined with stretching, a compound having a large refractivity anisotropy may be added to the film for further increasing the refractive anisotropy of the film. For example, when the film to which a compound having at least two aromatic rings is added as an additive thereto is stretched, the main chain of the polymer constituting the film is oriented, and with that, the compound itself becomes well orientable and the film may be regulated to have desired optical properties with ease.

The compound having at least two aromatic rings includes, for example, triazine compounds as in JP-A 2003-344655, rod-shaped compounds as in JP-A 2002-363343, liquid crystalline compounds as in JP-A 2005-134884 and 2007-119737, etc. More preferred are triazine compounds and rod-shaped compounds. Two or more different types of compounds having at least two aromatic rings may be used, as combined. The molecular weight of the compound having at least two aromatic rings is preferably from 300 to 1200 or so, more preferably from 400 to 1000.

The amount of the compound having at least two aromatic rings to be added is preferably from 0.05% to 10% in terms of the ratio by mass to cellulose acylate resin, more preferably from 0.5% to 8%, even more preferably from 1% to 5%. The compound having two aromatic rings may serve also as the compound of the formula (1) or (2) for use in the invention. On the other hand, when the compound having two aromatic rings has a 1,3,5-triazine ring structure but does not satisfy the formula (1) or (2), then the amount of the compound having two aromatic rings to be added is preferably from 0.05% to 10% in terms of the ratio by mass to cellulose acylate resin, more preferably from 0.5% to 8%, even more preferably from 1% to 5% from the viewpoint of the humidity dependence improvability of the compound.

(Optical Anisotropy Regulator)

The polymer film of the invention may contain an optical anisotropy regulator. For example, examples of the regulator include "Rth-reducing compounds" described in JP-A 2006-30937, pp. 23-72.

(Mat Agent Particles)

A mat agent may be added to the polymer film. Particles usable as the mat agent include silicon dioxide, titanium dioxide, aluminum oxide, zirconium oxide, calcium carbonate, talc, clay, fired kaolin, fired calcium silicate, calcium silicate hydrate, aluminum silicate, magnesium silicate and calcium phosphate. As the particles, preferred are silicon-containing ones as lowering the turbidity of the film, and more preferred is silicon dioxide.

As silicon dioxide particles, for example, usable are commercial products such as Aerosil R972, R972V, R974, R812, 200, 200V, 300, R202, OX50, TT600 (all by Nippon Aerosil), etc. Zirconium oxide particles are commercially available, for example, as Aerosil R972 and R811 (both by Nippon Aerosil), and are usable herein.

In producing a polymer film containing particles having a small secondary mean particle size, usable is a dispersion of the particles. For example, an example of producing a cellulose acylate film is described, in which some methods may be taken into consideration in preparing a dispersion of particles. For example, there is mentioned a method where a dispersion of particles is previously prepared by stirring and mixing a solvent and particles, and the particle dispersion is added to a small amount of a cellulose acylate solution separately prepared and dissolved therein with stirring, and then this is further mixed with a main cellulose acylate dope liquid. According to the method, the silicon dioxide particles are well dispersible and the dispersed silicon dioxide particles hardly reaggregate, and the method is a favorable method. Apart from this, there may be mentioned another method in which a small amount of cellulose acylate is added to a solvent and dissolved therein with stirring, and particles are added thereto and dispersed with a disperser to prepare a particles-added liquid, and the particles-added liquid is well mixed with a dope liquid using an in-line mixer. Any of those methods is employable herein, and the invention is not limited to these methods.

The solvent to be used in the above preparation methods may be a lower alcohol, preferably methyl alcohol, ethyl alcohol, propyl alcohol, isopropyl alcohol, butyl alcohol, etc. Not specifically defined, any other solvent than such a lower alcohol is also usable, for which preferred are solvents for use in cellulose acylate film formation.

(Low-Molecular Plasticizer, Degradation Inhibitor, Release Agent)

Various other additives than those mentioned above (e.g., low-molecular plasticizer, UV inhibitor, degradation inhibitor, release agent, IR absorbent, etc.) may be added to the polymer film in the process of producing the film, depending on the applications of the film. The additives may be solid or oily, or that is, they are not specifically defined in point of their melting point and boiling point thereof. For example, for the additive, UV absorbents at 20° C. or lower and at 20° C. or higher may be mixed, or plasticizers may also be mixed in the same manner. For example, these are described in JP-A 2001-151901. IR absorbent dyes are described in, for example, JP-A 2001-194522. The time at which the additive is added may be in any stage in the step of dope preparation; however, the additive may be added in the final stage of the dope preparation step. Not specifically defined, the amount of the material to be added may be any one capable expressing the function thereof. In the case where the polymer film is formed of two or more layers, then the type and the amount of the additive to be added to the constitutive layers may differ. For example, as in JP-A 2001-151902, the related technique is known in the art. Regarding the details of the additives, the materials described in Hatsumei Kyokai Disclosure Bulletin No. 2001-1745, pp. 16-22, (published in Mar. 15, 2001 by Hatsumei Kyokai) are preferred for use in the invention.

(2-4) Production Method for Polymer Film:

The polymer film of the invention is preferably produced according to a solution-casting method (solvent-casting method). According to a solvent-casting method, a polymer is dissolved in an organic solvent to prepare a dope, and the resulting dope is cast onto the surface of a support formed of a metal or the like, and dried into a film, and thereafter the film is peeled away from the support surface, and stretched.

For production examples for cellulose acylate film according to a solvent casting method, reference may be made to U.S. Pat. Nos. 2,336,310, 2,367,603, 2,492,078, 2,492,977, 2,492,978, 2,607,704, 2,739,069 and 2,739,070; British Patent 640731 and 736892; JP-B 45-4554 and 49-5614; JP-A 60-176834, 60-203430 and 62-115035, etc. The cellulose acylate film may be stretched. Regarding the method and the condition for the stretching treatment, for example, reference may be made to the examples described in JP-A 62-115035, 4-152125, 4-284211, 4-298310, 11-48271, etc.

(2-5) Characteristics of Polymer Film:
(Re and Rth)

The preferred range of the optical characteristics of the polymer film of the invention may change depending on the use of the film. In an embodiment where the film is used in a VA-mode liquid crystal display device, preferably, its Re(589) is from 30 nm to 200 nm, and its Rth(589) is from 70 nm to 400 nm; more preferably, its Re(589) is from 30 nm to 150 nm, and its Rth(589) is from 100 nm to 300 nm; even more preferably, its Re(589) is from 40 nm to 100 nm, and its Rth(589) is from 100 nm to 250 nm.

(Humidity Dependence of Re and Humidity Dependence of Rth)

Regarding the polymer film of the invention, the fluctuation between its Re and Rth when the film is conditioned at 25° C. and at a relative humidity of 10% for 12 hours (hereinafter these may be referred to as Re(10%) and Rth(10%)) and its Re and Rth conditioned at 25° C. and a relative humidity of 80% for 12 hours (hereinafter these may be referred to as Re (80%) and Rth (80%)) is small. When the humidity dependence of the optical characteristic of the film is enhanced in that manner, then Re and Rth fluctuation of the film under the condition under which the humidity of the usage environment varies can be prevented and the film can exhibit the retardation falling within the above-mentioned preferred range. Accordingly, the invention can provide a polymer film, especially a cellulose acylate film favorable for use under the condition under which the humidity of the usage environment varies.

Preferably, the polymer film of the invention has an Re humidity dependence ($\Delta Re=Re(10\%)-Re(80\%)$) of less than 11 nm, more preferably at most 10 nm, even more preferably at most 9.5 nm.

Preferably, the polymer film of the invention has an Rth humidity dependence ($\Delta Rth=Rth(10\%)-Rth(80\%)$) of at most 21 nm, more preferably at most 20 nm, even more preferably at most 19 nm.

(Film Thickness)

In an embodiment where the polymer film of the invention is used as a part in a device that is desired to have a thinned body, for example, as a part of a liquid crystal display device or the like, the film is preferably thinner. However, if too thin, the film could not exhibit the optical characteristics necessary for the use. In an embodiment where the film of the invention is used as an optical compensatory film in a liquid crystal display device, or as a protective film for a polarizer, the film thickness is preferably from 20 to 80 µm or so, more preferably from 25 to 70 µm or so, even more preferably from 30 to 60 µm or so.

3. Use of Polymer Film:

The polymer film of the invention has many applications. For example, it may be used as a retardation film (hereinafter this may be referred to as optical compensatory film) in liquid crystal display devices, as a protective film of polarizers, etc.

(Retardation Film)

The polymer film of the invention may be used as a retardation film. "Retardation film or optical compensatory film" means an optical material having optical anisotropy generally for use in display devices such as liquid crystal display devices, etc., and this has the same meaning as that of an optical compensatory sheet or the like. In a liquid crystal display device, such an optical compensatory film is used for the purpose of enhancing the contrast of the display panel, for enlarging the viewing angle and for solving a problem of color shift.

Plural polymer films of the invention may be laminated, or the polymer film of the invention may be laminated with any other film than the film of the invention, thereby suitably regulating Re and Rth of the resulting laminate to be an optical compensatory film. The film lamination may be attained with a sticking paste or an adhesive.

(Polarizer)

The polymer film of the invention may be used as a protective film for polarizers, and the invention provides a polarizer comprising the film. One example of the polarizer of the invention comprises a polarizing film and two protective films (transparent films) for protecting both surfaces of the polarizing film, in which the polymer film of the invention is used as at least one of the polarizer-protective films. In an embodiment where the polymer film of the invention is used as a support and an optically-anisotropic layer of a liquid crystal composition is formed on the surface of the support, and where the polymer film is used as a protective film for a polarizer, it is desirable that the back side (on which the optically-anisotropic layer is not formed) of the polymer film of the invention serving as a support is stuck to the surface of the polarizing film.

In the case where the polymer film of the invention is used as a protective film for the polarizer, the polymer film of the invention is preferably hydrophilicated through the above-mentioned surface-treatment (e.g., as described in JP-A 6-94915 and 6-118232), and for example, the film is preferably processed for glow discharge treatment, corona discharge treatment, or alkali saponification. In particular, in the case where the polymer film of the invention is a cellulose acylate film, the surface treatment of the film is most preferably alkali saponification.

As the polarizing film, for example, usable is a film produced by dipping a polyvinyl alcohol film in an iodine solution and stretching it. In the case where the polarizing film produced by dipping a polyvinyl alcohol film in an iodine solution and stretching it is used, the surface-treated surface of the polymer film of the invention may be directly stuck to both surfaces of the polarizing film with an adhesive. In the production method of the invention, it is desirable that the polymer film is directly stuck to the polarizing film in the manner as above. As the adhesive, usable is an aqueous solution of polyvinyl alcohol or polyvinyl acetal (e.g., polyvinyl butyral) or a latex of a vinylic polymer (e.g., polybutyl acrylate). Especially preferred as the adhesive is an aqueous solution of a completely-saponified polyvinyl alcohol.

In general, in a liquid crystal display device, a liquid crystal cell is disposed between two polarizers. Therefore, the device has four polarizer-protective films. The polymer film of the invention may be used as any of those four polarizer-protective films, but the polymer film of the invention is especially useful as the protective film to be disposed between the polarizing film and the liquid crystal layer (liquid crystal cell) in the liquid crystal display device. As the protective film to be disposed on the side of the polarizing film opposite to the side of the polymer film of the invention, a transparent hard coat layer, an antiglare layer, an antireflection layer or the like may be disposed, and in particular, the film of the invention is favorable as the polarizer-protective film to be disposed as the outermost surface layer on the display panel side of the liquid crystal display device.

(Liquid Crystal Display Device)

The polymer film of the invention and the optically-compensatory film and the polarizer comprising the film can be used in various display modes of liquid crystal display devices. Various liquid crystal modes where the film of the invention can be used are described. Above all, the polymer film of the invention and the optically-compensatory film and the polarizer comprising the film are favorably used in VA-mode liquid crystal display devices. The liquid crystal display devices may be any of transmission-mode, reflection-mode or semitransmission-mode devices.

FIG. 1 shows a schematic cross-sectional view of one example of a liquid crystal display device of the invention. In FIG. 1, the upper side is a viewers' side (panel side), and the lower side is a backlight side.

The VA-mode liquid crystal display device of in FIG. 1 comprises a liquid crystal cell LC (comprising an upper substrate 1, a lower substrate 3 and a liquid crystal layer 5), and a pair of an upper polarizer P1 and a lower polarizer P2 disposed to sandwich the liquid crystal cell LC therebetween. In general, polarizing films are incorporated into the liquid crystal display device as polarizers having a protective film on both surfaces thereof; however, in FIG. 1, the outer protective film of the polarizing film is omitted. The polarizers P1 and P2 each have a polarizing film 8a and 8b, respectively; and they are so disposed that the absorption axes 9a and 9b thereof are perpendicular to each other. The liquid crystal cell LC is a VA-mode liquid crystal cell, and at the time of black level of display, the liquid crystal layer 5 is in homeotropic alignment as in FIG. 1. The upper substrate 1 and the lower substrate 3 each have an alignment film (not shown) and an electrode layer (not shown) on the inner surface thereof; and the substrate 1 has a color filter layer (not shown) on the viewers' side inner surface thereof.

Between the upper substrate 1 and the upper polarizing film 8a, and between the lower substrate 3 and the lower polarizing film 8b, disposed are retardation films 10a and 10b, respectively. The retardation films 10a and 10b are polymer films of the invention. The retardation films 10a and 10b are so disposed that the in-plane slow axes 11a and 11b thereof could be perpendicular to the absorption axes 9a and 9b of the upper polarizing film 8a and the lower polarizing film 8b, respectively. Specifically, the retardation films 10a and 10b are so disposed that their slow axes are perpendicular to each other. The retardations films 10a and 10b each comprising the polymer film of the invention contribute toward reducing the light leakage and the color shift that may occur in oblique directions at the time of black level of display.

(Hard Coat Film, Antiglare Film, Antireflection Film)

The polymer film of the invention may be applied to a hard coat film, an antiglare film, or an antireflection film, as the case may be. For the purpose of enhancing the visibility of flat panel displays such as LCD, PDP, CRT, EL and the like, any or all of a hard coat layer, an antiglare layer and an antireflection layer may be given to one or both surfaces of the polymer film of the invention. Preferred embodiments of such antiglare film and antireflection film are described in detail in Hatsumei Kyokai Disclosure Bulletin (No. 2001-1745, published on Mar. 15, 2001 by Hatsumei Kyokai), pp. 54-57, and are favorably applicable to the polymer film of the invention.

EXAMPLES

The characteristics of the invention are described more concretely with reference to the following Examples. In the following Examples, the material used, its amount and the ratio, the details of the treatment and the treatment process may be suitably modified or changed. Accordingly, the invention should not be limitatively interpreted by the Examples mentioned below.

Production Example 1

Production of Compound (1-6) of Formula (1)

The compound (1-6) of the invention was produced according to the method mentioned below.

Dicyandiamide (9.78 g, 116 mmol), benzonitrile (10.0 g, 97.0 mmol) and potassium hydroxide (3.26 g, 58.1 mmol) were added to methoxyethanol (80 mL), and heated under reflux for 3 hours. After cooled to room temperature, the reaction mixture was gradually added to water (300 mL), and the precipitated solid was collected through filtration and washed with water. The resulting crude product was recrystallized from water/ethanol (50/50 by volume) to give the intended product (1-6) (yield: 16.1 g, 88%).

Its chemical structure was confirmed through NMR spectrometry, MS spectrometry and elementary analysis.

Production Example 2

Production of Compound (2-2) of Formula (2)

The compound (2-2) of the invention was produced according to the method mentioned below.

According to the method described in the Journal of Organic Synthetic Chemistry Association of Japan 1967, Vol. 25, No. 9, 802-807, benzimidoylguanidine hydrochloride was produced. With cooling with ice, benzimidoylguanidine hydrochloride (24.0 g, 121 mmol) was added to an aqueous solution (73 mL) of sodium hydroxide (11.6g, 290 mmol) to which acetone (73 mL) had been added. With cooling with ice, an acetone solution (70 mL) of valeroyl chloride (16.0 g, 133 mmol) was dropwise added to the mixture, and stirred for 2 hours with cooling with ice. Using a rotary evaporator, acetone was removed from the resulting reaction mixture, the precipitated solid was collected through filtration and washed with water. The resulting crude product was recrystallized from methanol to give the intended product (2-2) (yield: 22.1 g, 80%).

Its chemical structure was confirmed through NMR spectrometry, MS spectrometry and elementary analysis.

The other compounds (1-1) to (1-5), (1-7) to (1-15) and (2-1) were produced according to the above-mentioned Production Example 1 and Production Example 2, and their chemical structures were confirmed through NMR spectrometry, MS spectrometry and elementary analysis.

Examples 1 to 20 and Comparative Examples 1 to 4

(Formation of Cellulose Acylate Film)

The above compound (1-6) (4 parts by mass) and the cellulose acylate resin shown in Table 2 below (100 parts by mass) were mixed in a solvent of methylene chloride (396 parts by mass) and ethanol (59 parts by mass) to prepare a cellulose acylate (concretely, cellulose acetate) solution. The solution was cast with a band caster, the resulting web was peeled away from the band, and thereafter this was stretched in TD (transverse direction of the film) by 35% at 140° C., then dried to give a cellulose acylate film (concretely, cellulose acetate film) having a thickness of 50 μm. This is a film of Example 1.

Films of Examples 2 to 20 shown in Table 2 below were produced in the same manner as that for the film of Example 1, for which, however, the type of the cellulose acylate resin was changed from A to that shown in Table 2 and the additive was changed from the compound (1-6) to that shown in Table 2. On the other hand, films of Comparative Examples 1 and 3 were produced with no additive added thereto. Films of Comparative Examples 2 and 4 were produced using a comparative compound 1 having the structure shown below as the additive.

Comparative Compound 1:

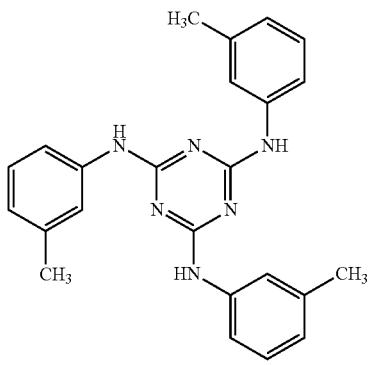 [SMILES: Cc1cccc(Nc2nc(Nc3cccc(C)c3)nc(Nc3cccc(C)c3)n2)c1]

(Evaluation of Optical Properties)

The films of Examples and Comparative Examples were sampled three times at three points in the cross direction (center, two edges (at the position of 5% of the overall width from each side)) at intervals of 10 m in the machine direction, thereby preparing 9 samples each having a size of 3 cm square. The samples were tested according to the method mentioned below, and the data were averaged.

The sample film was conditioned at 25° C. and a relative humidity of 60% for 24 hours, then using an automatic birefringence meter (KOBRA-21ADH by Oji Scientific Instruments), it was analyzed at 25° C. and a relative humidity of 60% for the retardation at a wavelength of 590 nm in the vertical direction to the film surface, and in oblique directions tilted from the film surface normal line at intervals of 10° within a range of +50° to −50°. The in-plane retardation (Re) and the thickness-direction retardation (Rth) of each film sample were thus computed.

The results are shown in Table 2 below.

The humidity-dependent change of the retardation of the film was determined as follows: The film was analyzed in the same manner as above except that the film was conditioned at 25° C. and at a relative humidity of 10% for 2 hours and Re and Rth of the film were measured (Re(10%) and Rth(10%)). The film was analyzed also in the same manner as above except that film was conditioned at 25° C. and at a relative humidity of 80% for 12 hours and Re and Rth of the film were measured (Re(80%) and Rth(80%)). From the found data, the Re humidity dependence (ΔRe) and the Rth humidity dependence (ΔRth) were computed.

The results are shown in Table 2, in which ΔRe indicates the Re humidity dependence and ΔRth indicates the Rth humidity dependence of the tested film.

TABLE 2

| | Additive | | Cellulose Acylate Resin | | | | | |
| | | | Degree of Acetyl | | | | | |
| | Compound | Amount Added [% by mass] | Type | Substitution (total degree of acyl substitution) | Re [nm] | Rth [nm] | ΔRe [nm] | ΔRth [nm] |
|---|---|---|---|---|---|---|---|---|
| Example 1 | (1-6) | 4 | A | 2.42 | 59.2 | 141.3 | 7.4 | 13.4 |
| Example 2 | (1-6) | 6 | A | 2.42 | 62.0 | 158.0 | 5.2 | 10.2 |
| Example 3 | (1-1) | 4 | A | 2.42 | 39.9 | 86.1 | 9.4 | 16.3 |
| Example 4 | (1-4) | 4 | A | 2.42 | 41.2 | 88.0 | 9.2 | 16.1 |
| Example 5 | (1-5) | 4 | A | 2.42 | 41.5 | 89.2 | 9.1 | 16.0 |
| Example 6 | (1-8) | 4 | A | 2.42 | 51.8 | 140.7 | 9.7 | 17.7 |
| Example 7 | (1-8) | 8 | A | 2.42 | 59.6 | 141.8 | 7.3 | 14.5 |
| Example 8 | (1-8) | 12 | A | 2.42 | 58.5 | 125.7 | 5.9 | 11.5 |
| Example 9 | (1-9) | 4 | A | 2.42 | 55.2 | 140.1 | 9.2 | 15.1 |
| Example 10 | (1-10) | 4 | A | 2.42 | 38.7 | 101.5 | 8.8 | 19.5 |
| Example 11 | (1-12) | 4 | A | 2.42 | 39.0 | 89.6 | 9.0 | 19.6 |
| Example 12 | (2-2) | 4 | A | 2.42 | 59.5 | 141.0 | 8.7 | 18.7 |
| Comparative Example 1 | none | 0 | A | 2.42 | 44.7 | 126.0 | 16.8 | 26.4 |
| Comparative Example 2 | Comparative Compound 1 | 4 | A | 2.42 | 94.2 | 201.3 | 11.8 | 22.6 |
| Example 13 | (1-1) | 4 | B | 2.86 | −8.5 | 11.5 | 9.3 | 17.7 |
| Example 14 | (1-6) | 4 | B | 2.86 | 4.6 | 43.6 | 8.0 | 16.8 |
| Example 15 | (1-6) | 6 | B | 2.86 | 6.7 | 54.7 | 6.7 | 14.8 |
| Example 16 | (1-7) | 8 | B | 2.86 | −4.0 | 21.0 | 8.8 | 18.1 |
| Example 17 | (1-11) | 8 | B | 2.86 | −15.0 | 9.5 | 8.0 | 17.6 |
| Example 18 | (1-14) | 8 | B | 2.86 | 12.0 | 56.2 | 8.1 | 18.0 |
| Example 19 | (1-13) | 8 | B | 2.86 | −5.7 | 11.6 | 9.8 | 19.5 |
| Example 20 | (2-1) | 8 | B | 2.86 | 3.5 | 37.2 | 9.0 | 18.9 |
| Comparative Example 3 | none | 0 | B | 2.86 | −10.4 | 13.0 | 12.7 | 27.5 |
| Comparative Example 4 | Comparative Compound 1 | 4 | B | 2.86 | 39.5 | 102.0 | 12.2 | 24.6 |

From the results in Table 2 above, it is known that the films to which the humidity dependence improver of the invention had been added were all improved in point of the humidity dependence of retardation, as compared with the films of Comparative Examples 1 to 4.

Production Example 3

Production of Compound (3-1) of Formula (6b)

Synthesis of Compound (3-1):

The compound (3-1) of the invention was produced according to the method mentioned below.

To N-ethylpyrrolidone (100 ml) were added acetoguanamine (10 g, 32 mmol), methyl benzoate (27 g) and sodium methoxide (22 g) and the mixture was stirred at 40° C. for 2 hours. After the reaction mixture was cooled to room temperature, ethyl acetate and water were added to separate the phases. The organic solution was washed with 1N aqueous solution of hydrogen chloride followed by water, and then dried with magnesium sulfate. The solvent was distilled off under a reduced pressure and purified by column chromatography to obtain Compound (3-1).

The NMR spectrum data of the obtained Compound (3-1) were as follows:

$^1$H-NMR (solvent: DMSO-d6, standard: tetramethylsilane) δ (ppm): 2.50 (3H, s), 7.45-7.55 (4H, m), 7.60-7.65 (2H, m), 7.90-8.00 (4H, m), 11.20 (2H, s)

Production Example 4

Production of Other Compounds of Formula (6b)

Synthesis of Compound (3-2):
Compound (3-2) was synthesized by the synthetic process of Compound (3-1) except that the starting material was changed from methyl benzoate to methyl o-methylbenzoate.
The NMR spectrum data of the obtained Compound (3-2) were as follows:
$^1$H-NMR (solvent: CDCl, standard: tetramethylsilane) δ (ppm): 2.50 (6H, s), 2.60 (3H, s), 7.20-7.30 (4H, m), 7.35-7.45 (2H, m), 7.50-7.60 (2H, m), 8.55 (2H, s)

Synthesis of Compound (3-3):
Compound (3-3) was synthesized by the synthetic process of Compound (3-1) except that the starting material was changed from methyl benzoate to methyl p-methylbenzate.
The NMR spectrum data of the obtained Compound (3-3) were as follows:
$^1$H-NMR (solvent: DMSO-d6, standard: tetramethylsilane) δ (ppm): 2.35 (6H, s), 2.50 (3H, s), 7.30 (4H, d), 7.85 (4H, d), 11.10 (2H, s)

Synthesis of Compound (3-4):
Compound (3-4) was synthesized by the synthetic process of Compound (3-1) except that the starting material was changed from methyl benzoate to methyl p-methoxylbenzoate.
The NMR spectrum data of the obtained Compound (3-4) were as follows:
$^1$H-NMR (solvent: DMSO-d6, standard: tetramethylsilane) δ (ppm): 2.50 (3H, s), 3.80 (6H, s), 7.00 (4H, d), 7.95 (4H, d), 11.00 (2H, s)

Synthesis of Compound (3-5):
Compound (3-5) was synthesized by the synthetic process of Compound (3-1) except that the starting material was changed from methyl benzoate to methyl m-methoxylbenzate.
The NMR spectrum data of the obtained Compound (3-5) were as follows:
$^1$H-NMR (solvent: DMSO-d6, standard: tetramethylsilane) δ (ppm): 2.50 (3H, s), 3.80 (6H, s), 7.10-7.20 (2H, m), 7.35-7.45 (2H, m), 7.50-7.60 (4H, m), 11.00 (2H, s)

Synthesis of Compound (3-6):
Compound (3-6) was synthesized by the synthetic process of Compound (3-1) except that the starting material was changed from methyl benzoate to methyl p-tert-butylbenzate.
The NMR spectrum data of the obtained Compound (3-6) were as follows:
$^1$H-NMR (solvent: DMSO-d6, standard: tetramethylsilane) δ (ppm): 1.30 (18H, s), 2.50 (3H, s), 7.55 (4H, d), 7.95 (4H, d), 11.00 (2H, s)

Synthesis of Compound (3-7):
Compound (3-7) was synthesized by the synthetic process of Compound (3-1) except that the starting material was changed from methyl benzoate to methyl m-methylbenzate.

The NMR spectrum data of the obtained Compound (3-7) were as follows:
$^1$H-NMR (solvent: CDCl$_3$, standard: tetramethylsilane) δ (ppm): 2.40 (6H, s), 2.65 (3H, s), 7.35-7.45 (4H, m), 7.70-7.80 (4H, m), 8.80 (2H, s)

Synthesis of Compound (3-8):
Compound (3-8) was synthesized by the synthetic process of Compound (3-1) except that the starting material was changed from methyl benzoate to methyl p-chlorobenzate.
The NMR spectrum data of the obtained Compound (3-8) were as follows:
$^1$H-NMR (solvent: CDCl$_3$, standard: tetramethylsilane) δ (ppm): 2.60 (3H, s), 7.40-7.50 (4H, m), 7.90-8.00 (4H, m), 9.10 (2H, s)

Synthesis of Compound (3-9):
Compound (3-9) was synthesized by the synthetic process of Compound (3-1) except that the starting material was changed from methyl benzoate to methyl o-chlorobenzate.
The NMR spectrum data of the obtained Compound (3-9) were as follows:
$^1$H-NMR (solvent: CDCl$_3$, standard: tetramethylsilane) δ (ppm): 2.50 (3H, s), 7.30-7.50 (6H, m), 7.60-7.70 (2H, m), 8.95 (2H, s)

Synthesis of Compound (3-10):
Compound (3-10) was synthesized by the synthetic process of Compound (3-1) except that the starting material was changed from methyl benzoate to methyl m-chlorobenzate.
The NMR spectrum data of the obtained Compound (3-10) were as follows:
$^1$H-NMR (solvent: CDCl$_3$, standard: tetramethylsilane) δ (ppm): 2.50 (3H, s), 7.55 (2H, m), 7.70 (2H, m), 7.90 (2H, m), 8.00 (2H, s), 11.35 (2H, s)

Synthesis of Compound (3-11):
Compound (3-11) was synthesized by the synthetic process of Compound (3-1) except that the starting material was changed from methyl benzoate to methyl o-methoxybenzate.
The NMR spectrum data of the obtained Compound (3-11) were as follows:
$^1$H-NMR (solvent: DMSO-d6, standard: tetramethylsilane) δ (ppm): 2.40 (3H, s), 3.80 (6H, s), 7.00-7.20 (4H, m), 7.55 (2H, m), 7.65 (2H, m), 10.70 (2H, s)

Synthesis of Compound (3-12):
Compound (3-12) was synthesized by the synthetic process of Compound (3-1) except that the starting material was changed. The structure of the obtained compound was confirmed through MS spectrometry.

Synthesis of Compound (3-13):
Compound (3-13) was synthesized by the synthetic process of Compound (3-1) except that the starting material was changed. The structure of the obtained compound was confirmed through MS spectrometry.

Synthesis of Compound (3-14):
Compound (3-14) was synthesized by the synthetic process of Compound (3-1) except that the starting material was changed. The NMR spectrum data of the obtained Compound (3-14) were as follows:
$^1$H-NMR (solvent: DMSO-d6, standard: tetramethylsilane) δ (ppm): 2.40 (3H, s), 4.00 (4H, s), 7.20-7.30 (10H, m), 10.90 (2H, s)

Synthesis of Compound (3-15):
Compound (3-15) was synthesized by the synthetic process of Compound (3-1) except that the ester as the starting material was changed. The NMR spectrum data of the obtained Compound (3-15) were as follows:
$^1$H-NMR (solvent: DMSO-d6, standard: tetramethylsilane) δ (ppm): 2.40 (3H, s), 3.80 (3H, s), 7.15 (1H, m), 7.35-7.55 (5H, m), 7.75 (2H, m), 11.10 (1H, s), 11.20 (1H, s)

Synthesis of Compound (3-16):

Compound (3-16) was synthesized by the synthetic process of Compound (3-1) except that benzoguanamine and methyl p-tert-butylbenzate were used as starting materials. The NMR spectrum data of the obtained Compound (3-16) were as follows:

¹H-NMR (solvent: DMSO-d6, standard:tetramethylsilane) δ (ppm): 1.35 (18H, s), 7.50-7.60 (7H, m), 7.90-8.00 (4H, m), 7.30 (2H, m), 11.20 (2H, s)

Synthesis of Compound (3-17):

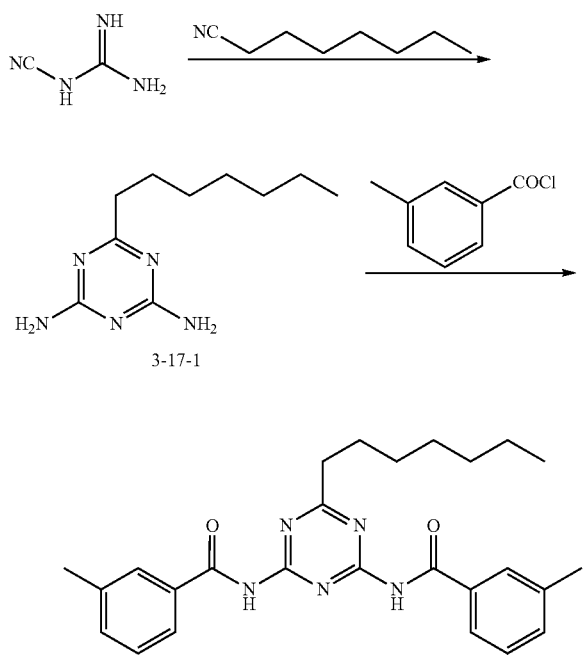

Intermediate Compound (3-17-1) was synthesized according to the method described in Chemistry-A European Journal, 2005, vol. 11, #22 p. 6616-6628, and then Compound (3-17) was synthesized according to the synthetic process of Compound (3-7). The structure of the obtained compound was confirmed through MS spectrometry.

Synthesis of Compound (3-18):

Compound (3-18) was synthesized by a process similar to the synthetic process of Compound (3-17). The structure of the obtained compound was confirmed through MS spectrometry.

Synthesis of Compound (4-31):

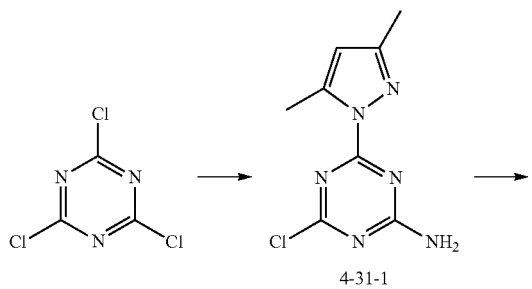

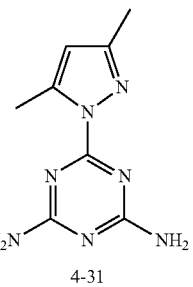

A solution of cyanuric chloride (77 g) in tetrahydrofuran (300 ml) was cooled to 0° C. To the solution was dropped a solution of 3,5-dimethylpyrazole (40 g) and diisopropylethylamine (54 g) in tetrahydrofuran (the reaction temperature was 5° C. or lower). The mixture was stirred at a room temperature for 30 minutes and cooled to 0° C. An ammonia solution (25%, 90 ml) was dropped to the mixture, and the mixture was stirred at a room temperature for 3 hours. Water was added to the reaction mixture and it was filtered and washed with water. The obtained solid was washed with ethyl acetate and then filtered and dried to obtain Intermediate Compound (4-31-1). An ammonia solution (25%, 200 ml) and tetrahydrofuran (50 ml) were added to Intermediate compound (4-31-1) (20 g) and the mixture was stirred at 50° C. for 5 hours and cooled to a room temperature. Water was added to the reaction mixture and the resultant was filtered to obtain Compound (4-31).

The NMR spectrum data of the obtained Compound (4-31) were as follows:

¹H-NMR (solvent: DMSO-d6, standard: tetramethylsilane) δ (ppm): 2.10 (3H, s), 2.60 (3H, s), 6.00 (1H, s), 6.80-7.00 (4H, m)

Synthesis of Compound (4-32):

Intermediate Compound (4-31-1) and Compound (4-32) were synthesized by the synthetic process of Compound (4-31) except that an aqueous solution of methylamine (40%) was used in place of an ammonia solution (25%) after the synthesis of Intermediate Compound (4-31-1). The NMR spectrum data of the obtained Compound (4-32) were as follows:

¹H-NMR (solvent: DMSO-d6, standard: tetramethylsilane) δ (ppm): 2.10 (3H, m), 2.55 (3H, m), 2.80 (3H, m), 6.00 (1H, m), 6.80, 7.00, 7.20, 7.40 (3H, br)

Synthesis of Compound (4-33):

Intermediate Compound (4-31-1) and Compound (4-33) were synthesized by the synthetic process of Compound (4-31) except that an aqueous solution of ethylamine (70%) was used in place of an ammonia solution (25%) after the synthesis of Intermediate Compound (4-31-1). The NMR spectrum data of the obtained Compound (4-33) were as follows:

¹H-NMR (solvent: DMSO-d6, standard: tetramethylsilane) δ (ppm): 1.10 (3H, t), 2.10 (3H, m), 2.60 (3H, m), 3.30 (2H, m), 6.00 (1H, m), 6.80, 7.00, 7.25, 7.50 (3H, br)

Synthesis of Compound (4-34):

Compound (4-34) was synthesized by the synthetic process of Compound (4-31) except that an aqueous solution of methylamine (40%) was used in place of an ammonia solution (25%). The structure of the obtained compound was confirmed through MS spectrometry.

Synthesis of Compound (4-1):

Compound (4-1) was synthesized by the synthetic process of Compound (4-31) except that morpholine was used in place of 3,5-dimethylpirazole. The NMR spectrum data of the obtained Compound (4-1) were as follows:

$^1$H-NMR (solvent: DMSO-d6, standard: tetramethylsilane) δ (ppm): 3.60 (8H, m), 6.15 (4H, s)

Examples 21 to 39 and Comparative Examples 1 to 4

Cellulose acylate films of Examples 21 to 39 were prepared by the process of Example 1 except that the obtained compounds were used. The optical properties of the cellulose acylate films of Examples 21 to 27 were evaluated by the method of Example 1. The results are shown in Table 3 below.

TABLE 3

|  | Additive | | Cellulose Acylate Resin | | | | |
|---|---|---|---|---|---|---|---|
|  | Compound | Amount Added [% by mass] | Type | Degree of Acetyl Substitution (total degree of acyl substitution) | Re [nm] | Rth [nm] | ΔRe [nm] | ΔRth [nm] |
| Example 21 | (3-1) | 4 | A | 2.42 | 62.2 | 163.5 | 6.9 | 13.7 |
| Example 22 | (3-3) | 4 | A | 2.42 | 69.2 | 166.1 | 7.1 | 14.7 |
| Example 23 | (3-5) | 4 | A | 2.42 | 60.0 | 150.2 | 8.0 | 16.6 |
| Example 24 | (3-6) | 4 | A | 2.42 | 49.6 | 140.3 | 10.8 | 17.9 |
| Example 25 | (3-7) | 4 | A | 2.42 | 66.2 | 152.3 | 8.8 | 15.2 |
| Example 26 | (3-10) | 4 | A | 2.42 | 51.9 | 161.8 | 8.5 | 15.6 |
| Example 27 | (3-15) | 4 | A | 2.42 | 73.9 | 194.7 | 8.7 | 15.2 |
| Example 28 | (4-31) | 4 | A | 2.42 | 58.0 | 139.1 | 7.0 | 13.0 |
| Example 29 | (4-31) | 6 | A | 2.42 | 61.4 | 154.8 | 5.0 | 10.1 |
| Example 30 | (4-32) | 4 | A | 2.42 | 57.3 | 139.5 | 7.1 | 13.3 |
| Example 31 | (4-33) | 4 | A | 2.42 | 55.7 | 138.7 | 7.4 | 14.2 |
| Example 32 | (4-34) | 4 | A | 2.42 | 52.5 | 135.0 | 8.4 | 15.2 |
| Example 33 | (4-1) | 2 | A | 2.42 | 48.0 | 130.2 | 9.5 | 19.8 |
| Comparative Example 1 | no | 0 | A | 2.42 | 44.7 | 126.0 | 16.8 | 26.4 |
| Comparative Example 2 | Comparative Compound 1 | 4 | A | 2.42 | 94.2 | 201.3 | 11.8 | 22.6 |
| Example 34 | (3-1) | 4 | B | 2.86 | 7.2 | 63.0 | 7.6 | 16.0 |
| Example 35 | (3-3) | 4 | B | 2.86 | 11.9 | 65.1 | 7.9 | 16.7 |
| Example 36 | (3-7) | 6 | B | 2.86 | 13.1 | 68.2 | 6.3 | 14.2 |
| Example 37 | (4-31) | 4 | B | 2.86 | 3.7 | 39.9 | 7.3 | 15.4 |
| Example 38 | (4-31) | 6 | B | 2.86 | 5.7 | 41.8 | 5.8 | 13.6 |
| Example 39 | (4-32) | 4 | B | 2.86 | 3.6 | 38.7 | 8.2 | 16.5 |
| Comparative Example 3 | no | 0 | B | 2.86 | −10.4 | 13.0 | 12.7 | 27.5 |
| Comparative Example 4 | Comparative Compound 1 | 4 | B | 2.86 | 39.5 | 102.0 | 12.2 | 24.6 |

From the results in Table 3 above, it is known that the films to which the humidity dependence improver of the invention had been added were all improved in point of the humidity dependence of retardation, as compared with the films of Comparative Examples 1 to 4 in Table 2 above.

While the present invention has been described in detail and with reference to specific embodiments thereof, it will be apparent to one skilled in the art that various changes and modifications can be made therein without departing from the scope thereof.

The present disclosure relates to the subject matter contained in Japanese Patent Application No. 227017/2009, filed on Sep. 30, 2009, and Japanese Patent Application No. 213841/2010, filed on Sep. 24, 2010, the contents of which are herein incorporated by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A retardation film comprising a polymer film wherein the polymer film comprises a polymer having a hydroxyl group and a humidity dependence improver for polymer film, comprising a compound of the following formula (6), (6b) or (9):

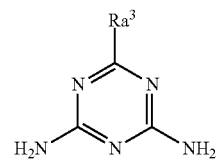

Formula (6)

wherein Ra$^3$ represents an alkyl group, an alkenyl group, an alkynyl group, an aryl group or a heterocyclic group;

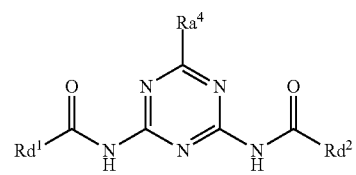

Formula (6b)

wherein Ra$^4$ represents an alkyl group, an alkenyl group, an alkynyl group, an aryl group or a heterocyclic group, and Rd$^1$ and Rd$^2$ each independently represent an alkyl group or an aryl group; and Formula (9)

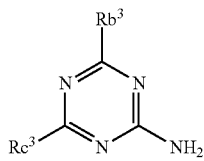

wherein Rb$^3$ and Rc$^3$ each independently represent an alkyl group, an alkenyl group, an alkynyl group, an aryl group or a heterocyclic group.

2. A polarizer comprising a polymer film wherein the polymer film comprises a polymer having a hydroxyl group and a humidity dependence improver for polymer film, comprising a compound of the following formula (6), (6b) or (9):

Formula (6)

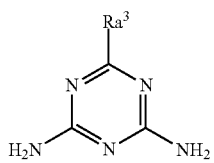

wherein Ra$^3$ represents an alkyl group, an alkenyl group, an alkynyl group, an aryl group or a heterocyclic group;

Formula (6b)

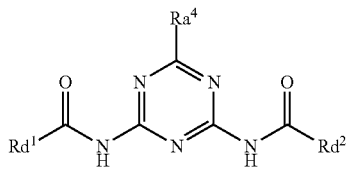

wherein Ra$^4$ represents an alkyl group, an alkenyl group, an alkynyl group, an aryl group or a heterocyclic group, and Rd$^1$ and Rd$^2$ each independently represent an alkyl group or an aryl group; and Formula (9)

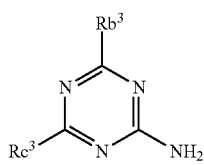

wherein Rb$^3$ and Rc$^3$ each independently represent an alkyl group, an alkenyl group, an alkynyl group, an aryl group or a heterocyclic group.

3. A liquid crystal display device comprising the polymer film wherein the polymer film comprises a polymer having a hydroxyl group and a humidity dependence improver for polymer film, comprising a compound of the following formula (6), (6b) or (9):

Formula (6)

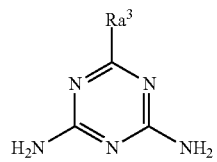

wherein Ra$^3$ represents an alkyl group, an alkenyl group, an alkynyl group, an aryl group or a heterocyclic group;

Formula (6b)

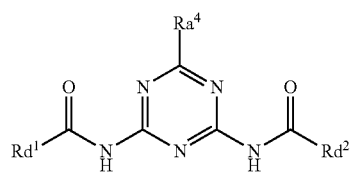

wherein Ra$^4$ represents an alkyl group, an alkenyl group, an alkynyl group, an aryl group or a heterocyclic group, and Rd$^1$ and Rd$^2$ each independently represent an alkyl group or an aryl group; and Formula (9)

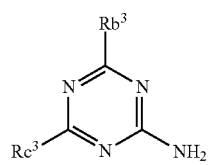

wherein Rb$^3$ and Rc$^3$ each independently represent an alkyl group, an alkenyl group, an alkynyl group, an aryl group or a heterocyclic group.

4. The retardation film according to claim 1, wherein the humidity dependence improver comprises the compound of formula (6).

5. The retardation film according to claim 1, wherein the humidity dependence improver comprises the compound of formula (6b).

6. The retardation film according to claim 1, wherein the humidity dependence improver comprises the compound of formula (9).

7. The polarizer according to claim 2, wherein the humidity dependence improver comprises the compound of formula (6).

8. The polarizer according to claim 2, wherein the humidity dependence improver comprises the compound of formula (6b).

9. The polarizer according to claim 2, wherein the humidity dependence improver comprises the compound of formula (9).

10. The liquid crystal display device according to claim 3, wherein the humidity dependence improver comprises the compound of formula (6).

11. The liquid crystal display device according to claim 3, wherein the humidity dependence improver comprises the compound of formula (6b).

12. The liquid crystal display device according to claim 3, wherein the humidity dependence improver comprises the compound of formula (9).

* * * * *